(12) United States Patent  (10) Patent No.: US 9,587,571 B2
Hagari  (45) Date of Patent: Mar. 7, 2017

(54) CONTROL APPARATUS FOR AN INTERNAL COMBUSTION ENGINE

(71) Applicant: MITSUBISHI ELECTRIC CORPORATION, Tokyo (JP)

(72) Inventor: Hideki Hagari, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 85 days.

(21) Appl. No.: 14/621,627

(22) Filed: Feb. 13, 2015

(65) Prior Publication Data
US 2015/0377156 A1  Dec. 31, 2015

(30) Foreign Application Priority Data
Jun. 25, 2014 (JP) ................. 2014-130236

(51) Int. Cl.
*F02D 41/00* (2006.01)
*F02D 9/02* (2006.01)
(Continued)

(52) U.S. Cl.
CPC .......... *F02D 41/0007* (2013.01); *F02B 37/18* (2013.01); *F02D 9/02* (2013.01); *F02D 11/106* (2013.01); *F02D 41/2451* (2013.01); *F02D 11/10* (2013.01); *F02D 41/18* (2013.01); *F02D 2009/022* (2013.01); *F02D 2009/0228* (2013.01); *F02D 2200/0402* (2013.01); *F02D 2200/0404* (2013.01);
(Continued)

(58) Field of Classification Search
CPC ...... F02D 41/007; F02D 11/106; F02B 37/18; F02B 9/02
See application file for complete search history.

(56) References Cited

U.S. PATENT DOCUMENTS 7,082,924 B1 * 8/2006 Ruedin ................. F02D 31/002
123/352
2007/0119172 A1 * 5/2007 Barbe ................... F02D 41/005
60/605.2
(Continued)

FOREIGN PATENT DOCUMENTS

| JP | 2013-224596 A | 10/2013 |
| JP | 2014-023903 A | 2/2014 |
| JP | 2014-084647 A | 5/2014 |

*Primary Examiner* — Nicholas J Weiss
*Assistant Examiner* — Jason T Newton
(74) *Attorney, Agent, or Firm* — Sughrue Mion, PLLC; Richard C. Turner

(57) ABSTRACT

A control apparatus for an internal combustion engine comprises a throttle upstream pressure estimation unit which calculates, based on an AFS intake air amount from an AFS and an intake manifold pressure, an average density ρave(n) in a region combining a supercharged portion from a downstream of a compressor to an upstream of a throttle valve and an intake manifold, and estimates a throttle upstream pressure based on the intake manifold pressure and the average density ρave(n). Further, the throttle upstream pressure estimation unit learns a relationship between a throttle opening degree and an effective opening area to correct a throttle upstream pressure estimated value (estimated P2) based on a range of a throttle opening degree learning value, the throttle opening degree learning value, and a dispersion of the actual throttle opening degree error.

9 Claims, 17 Drawing Sheets

(51) Int. Cl.
*F02B 37/18* (2006.01)
*F02D 41/24* (2006.01)
F02D 41/18 (2006.01)
F02D 11/10 (2006.01)

(52) U.S. Cl.
CPC ............... *F02D 2200/0408* (2013.01); *F02D 2200/704* (2013.01); *Y02T 10/144* (2013.01)

(56) References Cited

U.S. PATENT DOCUMENTS

| | | | |
|---|---|---|---|
| 2011/0067396 A1* | 3/2011 | Quigley | F02M 26/10 60/602 |
| 2014/0130506 A1* | 5/2014 | Gale | F02C 6/12 60/773 |
| 2014/0200791 A1* | 7/2014 | Saito | F02D 23/00 701/102 |
| 2015/0046064 A1* | 2/2015 | Lahti | F02M 26/02 701/103 |

* cited by examiner

START → CALCULATE THROTTLE OPENING DEGREE LEARNING VALUE (S1001) → CALCULATE THROTTLE OPENING DEGREE ERROR (S1002) → CALCULATE THROTTLE OPENING DEGREE ERROR DISPERSION (S1003) → RETURN

CONTROL APPARATUS FOR AN INTERNAL COMBUSTION ENGINE

BACKGROUND OF THE INVENTION

1. Field of the Invention

The present invention relates to a control apparatus for an internal combustion engine, and more particularly, to a control apparatus for an internal combustion engine for estimating a throttle upstream pressure, which being a pressure between a compressor and a throttle in an internal combustion engine equipped with a supercharger.

2. Description of the Related Art

Hitherto, there has been known a control system for an internal combustion engine (hereinafter referred to as "engine") equipped with a supercharger in order to increase an output of the engine. Known examples of the supercharger include a turbocharger (hereinafter also referred to as "T/C") in which a compressor to be driven by a high-speed rotation of a turbine rotated by energy contained in an exhaust gas is installed in an intake system of the engine, and a mechanical supercharger (hereinafter also referred to as "S/C") in which a compressor to be driven by a crankshaft via a belt is installed in the intake system of the engine.

Moreover, as a method of detecting an intake air amount in the engine control system, there have hitherto been known a method (hereinafter referred to as "AFS method") of detecting the intake air amount by using an airflow sensor (hereinafter referred to as "AFS"), and a so-called speed density method (hereinafter referred to as "S/D method") for estimating the intake air amount based on a pressure in an intake manifold (hereinafter referred to as "intake manifold pressure"). The AFS method directly measures an air flow rate (hereinafter referred to as "AFS intake air amount") passing through an installed location of the AFS (hereinafter referred to as "AFS portion"). An air flow rate (hereinafter referred to as "cylinder intake air amount") taken into a cylinder in a steady state operation is approximately equal to the AFS intake air amount. Accordingly, the AFS method has such a feature that a calculation error of the cylinder intake air amount in the steady state operation is relatively small compared with the S/D method. However, a distance from the AFS portion to the cylinder is long in the control system for an engine equipped with a supercharger, and hence a response lag and a density change need to be simulated for this distance to calculate the cylinder intake air amount. Thus, a calculation accuracy of the cylinder intake air amount in a transient operation is considered to depend on an accuracy of a physical model of the intake system for simulating the response lag and the density change. Then, a physical model of the intake system for dealing with this problem has hitherto been proposed (for example, refer to Japanese Patent Application No. 2014-084647 (hereinafter referred to as Prior Application 1)).

In a control system for an engine equipped with a turbocharger, which being a first embodiment of Prior Application 1, there is disclosed a method in which: an airflow sensor is used as a flow rate sensor; an atmospheric pressure sensor, a throttle upstream pressure sensor, and an intake manifold pressure sensor are used as pressure sensors; and a cylinder intake air amount and a throttle intake air amount are calculated based on information from those sensors. In a control system for an engine equipped with a mechanical supercharger, which being a second embodiment of Prior Application 1, there is disclosed a method in which: an airflow sensor is used as a flow rate sensor; an atmospheric pressure sensor, an S/C upstream pressure sensor, and an intake manifold pressure sensor are used as pressure sensors; and the cylinder intake air amount is calculated based on information from those sensors. However, there is a problem in that the use of such a large number of sensors leads to an increase in cost. Thus, as a method of estimating a physical amount without using any sensor, for example, there has been proposed a method of estimating the atmospheric pressure in a control system for an engine without a supercharger (hereinafter referred to as "N/A system") (for example, refer to Japanese Patent Application No. 2014-023903 (hereinafter referred to as Prior Application 2)).

In Prior Application 2, so as to precisely realize so-called torque-based control in the N/A system, there is disclosed a method of precisely estimating the atmospheric pressure in a wide operation region while carrying out throttle opening degree learning control for absorbing a machine difference dispersion of a throttle, thereby precisely controlling the intake air amount by performing throttle control while the atmospheric pressure sensor is omitted.

As described above, the control system for an engine equipped with a mechanical supercharger, which is the second embodiment of Prior Application 1, is configured so that the airflow sensor is used as the flow rate sensor, the atmospheric pressure sensor, the S/C upstream pressure sensor, and the intake manifold pressure sensor are used as the pressure sensors, and the cylinder intake air amount is calculated based on the information from those sensors, and hence a large number of sensors need to be used, resulting in a problem in that the cost is increased.

It is conceivable to apply the method of Prior Application 2 to eliminate the atmospheric pressure sensor in the case where the pressure on the upstream side of the throttle is the atmospheric pressure as in the second embodiment of Prior Application 1. However, the pressure on the upstream side of the throttle is not the atmospheric pressure in the first embodiment of Prior Application 1, and the atmospheric pressure cannot be estimated. In this case, even when an attempt is made to estimate the throttle upstream pressure, the throttle upstream pressure significantly changes depending on the operation state, and hence it is considered that it is difficult for the method of Prior Application 2 alone to follow the speed of the change, resulting in a problem in that the throttle upstream pressure cannot be precisely estimated.

SUMMARY OF THE INVENTION

The present invention has been made in view of the above-mentioned problems, and therefore has an object to provide a control apparatus for an internal combustion engine, which is capable of precisely estimating a throttle upstream pressure between a compressor and a throttle valve in an internal combustion engine equipped with a supercharger.

According to one embodiment of the present invention, there is provided a control apparatus for an internal combustion engine, including: a throttle valve arranged in an intake system of the internal combustion engine; a throttle opening degree detection unit configured to detect an opening degree of the throttle valve; a supercharger including a compressor arranged in the intake system upstream of the throttle valve; a throttle upstream pressure control unit configured to control a drive state of the supercharger, thereby controlling a throttle upstream pressure, which being a pressure in a supercharged portion downstream of the compressor and upstream of the throttle valve; an intake air amount detection unit arranged upstream of the compressor, and configured to detect an intake air amount; an intake manifold pressure detection unit configured to detect a pressure in an intake manifold portion downstream of the throttle valve as an intake manifold pressure; a cylinder intake air amount calculation unit configured to calculate a cylinder intake air amount taken from the intake manifold portion into a cylinder based on the intake manifold pressure; and a throttle upstream pressure estimation unit configured to calculate an average density in a region combining the supercharged portion and the intake manifold portion with each other based on the intake air amount and the cylinder intake air amount, and estimate the throttle upstream pressure based on the intake manifold pressure and the average density to output the estimated throttle upstream pressure as a throttle upstream pressure estimated value.

The control apparatus for an internal combustion engine according to one embodiment of the present invention includes the throttle upstream pressure estimation unit configured to calculate the average density in the region combining the supercharged portion and the intake manifold portion with each other based on the intake air amount and the cylinder intake air amount, and estimate the throttle upstream pressure based on the intake manifold pressure and the average density to output the estimated throttle upstream pressure as the throttle upstream pressure estimated value. Thus, the throttle upstream pressure between the compressor and the throttle valve can be precisely estimated even in an internal combustion engine system without the throttle upstream pressure sensor.

DETAILED DESCRIPTION OF THE PREFERRED EMBODIMENT

First Embodiment

Figure 1:
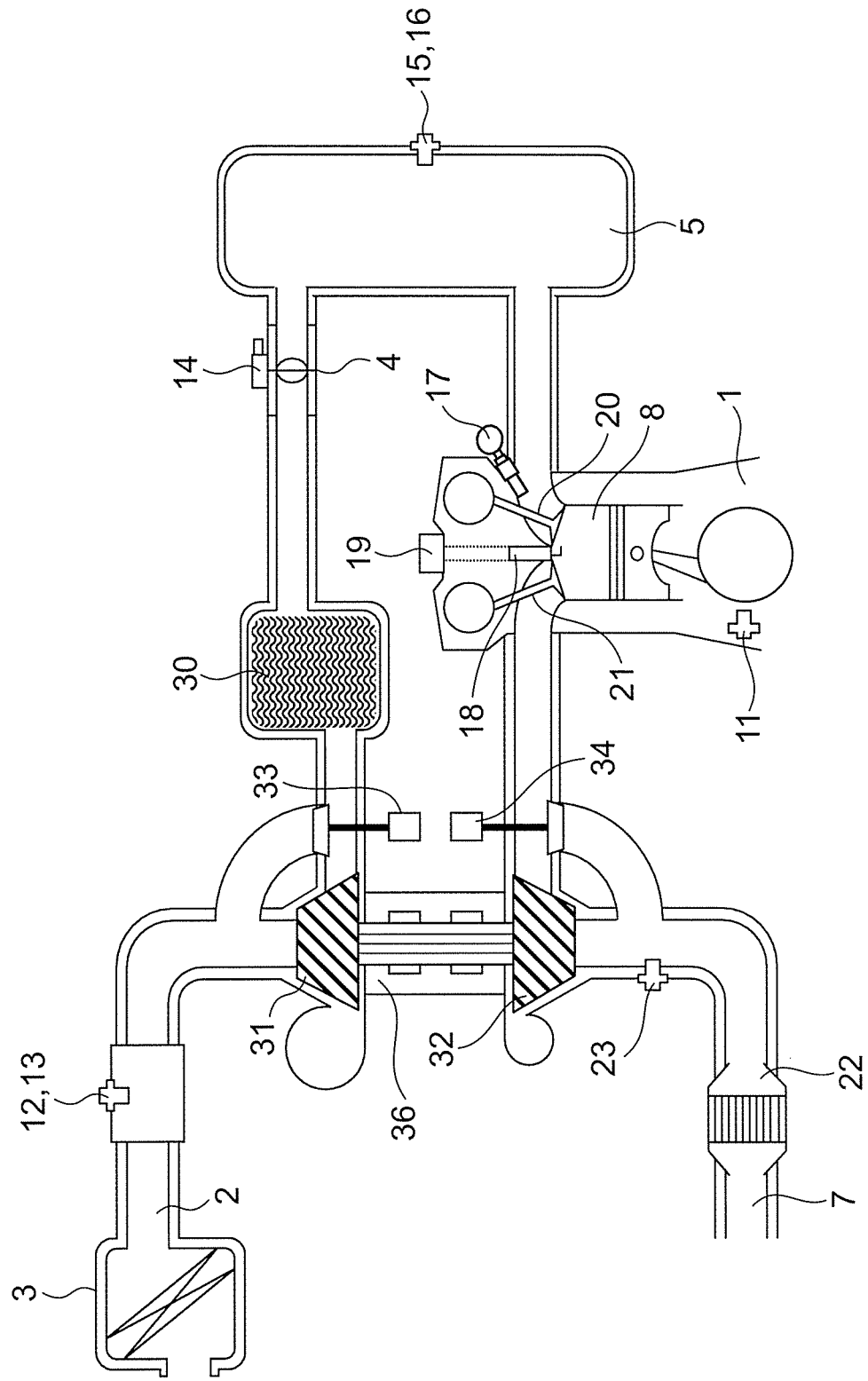
FIG. 1 is a configuration diagram illustrating an overview of a control system for an engine equipped with a turbocharger according to an embodiment of the present invention.

Now, an exemplary embodiment of the present invention is described referring to the accompanying drawings. In the drawings, the same or corresponding parts or elements are denoted by the same reference symbols for description. A control apparatus for an internal combustion engine according to the present invention precisely estimates a throttle upstream pressure between a compressor and a throttle in a control system for an engine equipped with a supercharger to control an internal combustion engine. In the following embodiment, a description is given of an engine control system using a turbocharger as a supercharger as an example.

FIG. 1 is a diagram illustrating an overview of a configuration of a control system for an engine equipped with a turbocharger according to an embodiment of the present invention. In FIG. 1, a crank angle sensor 11 for generating an electric signal corresponding to a rotation of a crankshaft is disposed on an engine 1. Moreover, an intake pipe 2 for forming an intake passage and an exhaust pipe 7 for forming an exhaust passage are each connected to a cylinder 8 of the engine 1.

An air cleaner 3 is disposed on the most upstream portion of the intake pipe 2. An AFS 12 for generating an electric signal corresponding to an intake air flow rate and an intake air temperature sensor 13 for generating an electric signal corresponding to an intake air temperature in the intake passage are integrally or separately provided on a downstream side of the air cleaner 3. FIG. 1 illustrates such an example that the AFS 12 and the intake air temperature sensor 13 are integrally constructed.

An exhaust gas purification catalyst 22 is provided in the most downstream portion of the exhaust gas pipe 7. An air-to-fuel ratio sensor 23 for generating an electric signal corresponding to a ratio of air to a burnt fuel is provided on an upstream side of the exhaust gas purification catalyst 22.

Moreover, a supercharger (turbocharger) 36 including a compressor 31 and a turbine 32 is provided in intake/exhaust systems constructed by the intake pipe 2 and the exhaust pipe 7. The turbine 32 is provided in the exhaust pipe 7 on the upstream side of the exhaust gas purification catalyst 22, and is configured to be rotationally driven by an exhaust gas flowing through the exhaust pipe 7. The compressor 31 is provided in the intake pipe 2 on a downstream side of the AFS 12. The compressor 31 is configured to be rotationally driven by a rotation of the turbine 32, thereby compressing the air in the intake passage.

An air bypass valve (hereinafter referred to as "ABV") 33 for bypassing the compressed air amount to the intake pipe 2 is provided on a downstream side of the compressor 31 so as to prevent a supercharged pressure from excessively increasing, mainly when an accelerator is released. An intercooler (hereinafter referred to as "I/C") 30 for cooling the air heated through adiabatic compression by the compressor 31 is provided on a downstream side of the ABV 33. An electronically-controlled throttle valve 4 for adjusting an air amount to be sent to the engine 1 is provided on a downstream side of the I/C 30. A throttle opening degree sensor 14 is connected to the throttle valve 4. The throttle opening degree sensor 14 generates an electric signal corresponding to an opening degree of the throttle valve 4.

An intake manifold 5 including a surge tank for suppressing an intake air pulsation is provided on a downstream side of the throttle valve 4. An intake manifold pressure sensor 15 and an intake manifold temperature sensor 16 for respectively generating electric signals corresponding to a pressure and a temperature in a space from the surge tank to the intake manifold are integrally or separately provided on the intake manifold 5. Note that, FIG. 1 illustrates such an example that the intake manifold pressure sensor 15 and the intake manifold temperature sensor 16 are integrally constructed.

An injector 17 for injecting a fuel is provided downstream of the intake manifold 5 on the engine 1 side. Note that, the injector 17 may be provided so as to directly inject the fuel into the cylinder 8.

An ignition plug 18 for igniting a combustible mixture generated by mixing the air taken into the engine 1 and the fuel injected from the injector 17 with each other, and an ignition coil 19 for supplying a current for igniting a spark to the ignition plug 18 are provided on the cylinder 8. Moreover, an intake valve 20 for adjusting an air amount to be introduced from the intake passage to the cylinder 8, and an exhaust valve 21 for adjusting an air amount to be exhausted from the cylinder 8 to the exhaust passage of the internal combustion engine are provided. Note that, a variable valve timing mechanism (hereinafter referred to as "VVT") for varying timings of opening/closing a valve or a variable valve lift mechanism (hereinafter referred to as "VVL") for varying a lift amount of the valve may be provided on both or one of respective camshafts for the intake valve 20 and the exhaust valve 21.

A waste gate valve 34 for bypassing the exhaust gas to an exhaust bypass passage so as not to damage the engine even if the supercharged pressure increases at a high rotation/high load is provided on a downstream side of the exhaust valve 21 and an upstream side of the turbine 32. Means for driving the waste gate valve 34 includes a pressure type of controlling a pressure applied on a diaphragm or an electric type of directly controlling the valve opening degree. In general, the pressure type can drive the waste gate valve 34 only when the supercharged pressure increases to a certain degree. However, the electric type, which does not have this restriction, can drive the waste gate valve 34 under any operation state and has such a feature that a controllable range for a throttle upstream pressure, which being a pressure between the compressor 31 and the throttle valve 4, is wide. In this embodiment, the waste gate valve 34 is the electric type, but completely the same method can be applied when the pressure type is used therefor.

Figure 2:
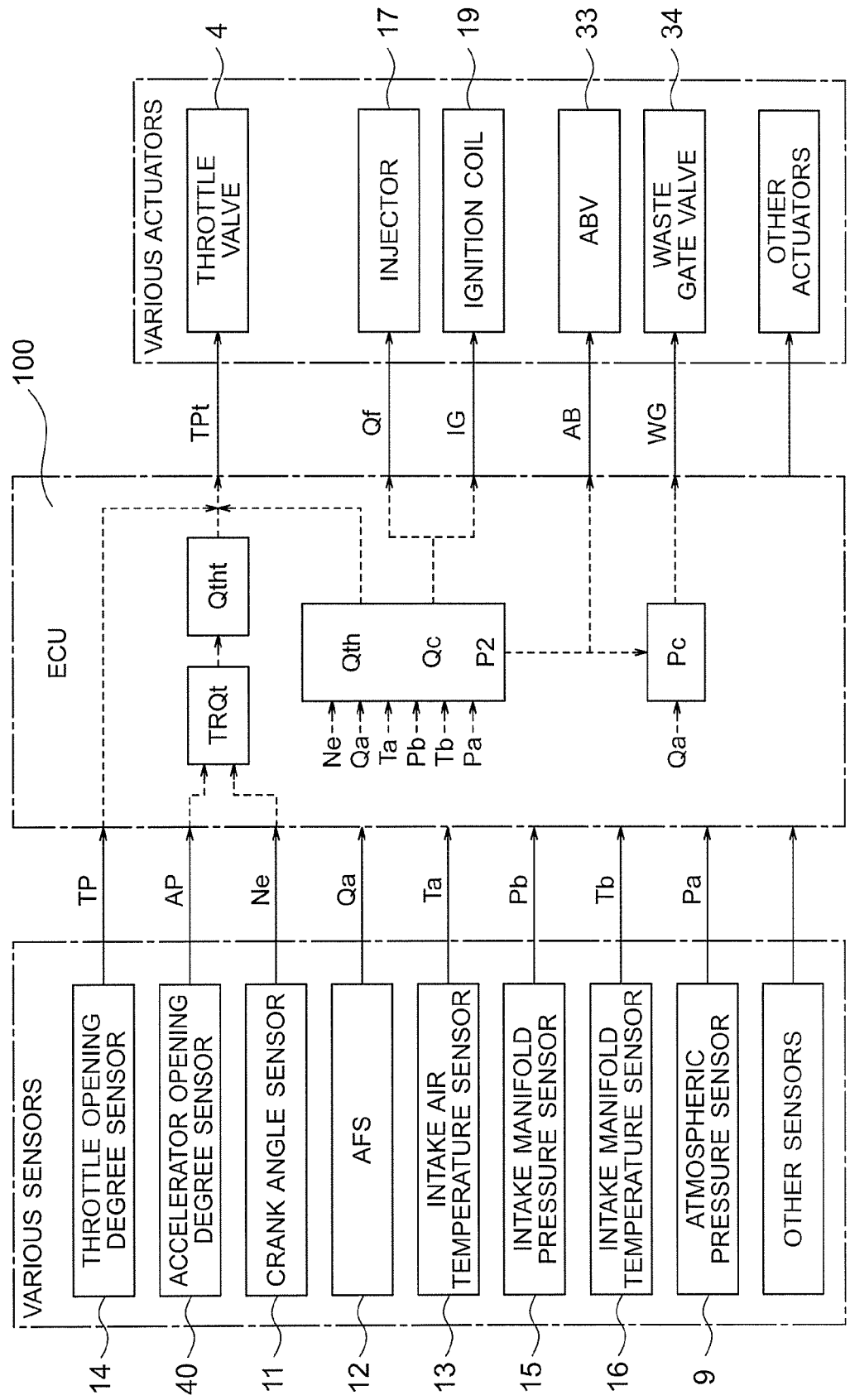
FIG. 2 is a control block diagram illustrating an overview of control by the control system for an engine equipped with a turbocharger according to the embodiment of the present invention.

FIG. 2 is a control block diagram illustrating an overview of a configuration of a control system for an engine equipped with a turbocharger according to the embodiment of the present invention. In FIG. 2, an electronic control unit (hereinafter referred to as "ECU") 100 is mainly constructed by a microcomputer including a CPU, a ROM, and a RAM as is well known. The ECU executes various control programs stored in the ROM to carry out various types of control for the engine 1 based on the operation state of the engine 1 at the moment. In other words, the ECU 100 inputs detection signals from the various sensors, calculates a target throttle opening degree, a fuel injection amount, an ignition timing, and the like based on the signals, and outputs signals for driving the throttle valve, the injector, the ignition coil, and the like.

Specifically, electric signals from the throttle opening degree sensor 14, the crank angle sensor 11, the AFS 12, the intake air temperature sensor 13, the intake manifold pressure sensor 15, and the intake manifold temperature sensor 16 are input to the ECU 100. Moreover, signals of an accelerator opening degree sensor 40 (not shown in FIG. 1) and an atmospheric pressure sensor 9 (not shown in FIG. 1) are also input to the ECU 100. The accelerator opening degree sensor 40 generates an electric signal corresponding to an operation amount of an accelerator pedal. The accelerator pedal is disposed at the foot of a driver's seat. The atmospheric pressure sensor 9 generates an electric signal corresponding to the atmospheric pressure. The atmospheric pressure sensor 9 may be disposed in a neighborhood of the air cleaner 3 of FIG. 1 or disposed on a circuit board of the ECU 100. Further, electric signals are also input to the ECU 100 from sensors other than the sensors described above. The other sensors illustrated in FIG. 2 include the air-to-fuel ratio sensor 23, a knock sensor (not shown) for detecting, for example, a vibration of a cylinder block of the engine 1, a water temperature sensor (not shown) for detecting a coolant temperature of the engine 1, and a vehicle speed sensor (not shown) for detecting a vehicle speed.

Moreover, the throttle valve 4, the injector 17, the ignition coil 19, the ABV 33, and the waste gate valve 34 are connected to an output side of the ECU 100. Moreover, actuators other than the actuators described above are connected to the ECU 100. The other actuators include, for example, actuators for driving the VVT disposed on the intake valve 20 or the exhaust valve 21.

The ECU 100 calculates a target output torque TRQt requested by the driver from an engine rotational speed Ne calculated based on a crank angle cycle from the crank angle sensor 11 and an accelerator opening degree AP calculated based on the accelerator opening degree sensor 40. Further, the ECU 100 calculates a target throttle intake air amount Qtht required to achieve the target output torque TRQt, and calculates a target throttle opening degree TPt required to achieve the target throttle intake air amount Qtht. The throttle valve 4 is driven based on the target throttle opening degree TPt. Further, the ECU 100 uses the throttle opening degree TP from the throttle opening degree sensor 14, thereby carrying out feedback control in order to precisely achieve the target throttle opening degree TPt.

Moreover, the ECU 100 uses a physical model of the intake system described later to calculate a throttle upstream pressure P2, which being a pressure between the compressor 31 and the throttle valve 4, a cylinder intake air amount Qc entering the cylinder 8, and a throttle intake air amount Qth passing through the throttle valve 4 based on the engine rotational speed Ne, an AFS intake air amount Qa from the AFS 12, an intake air temperature Ta from the intake air temperature sensor 13, an intake manifold pressure Pb from the intake manifold pressure sensor 15, an intake manifold temperature Tb from the intake manifold temperature sensor 16, and an atmospheric pressure Pa from the atmospheric pressure sensor 9. Further, based on the calculated cylinder intake air amount Qc, the injector 17 is driven so as to achieve a fuel injection amount Qf realizing a target air-to-fuel ratio for providing appropriate exhaust gases and exhaust temperature, and, further, the ignition coil 19 is driven so as to realize an appropriate ignition timing IG for preventing abnormal combustions such as knocking from occurring. Note that, feedback control based on the target air-to-fuel ratio and the output value of the air-to-fuel ratio sensor 23 is carried out for calculating the fuel injection amount Qf in the ECU 100.

Moreover, feedback control for the target throttle opening degree TPt is also carried out by using the throttle intake air amount Qth in order to precisely achieve the target throttle intake air amount Qtht described above. Moreover, control for an engine output is also carried out, which involves calculating, for example, a compressor driving force Pc disclosed in Japanese Patent Application Laid-open No. 2013-224596 from the AFS intake air amount Qa and the throttle upstream pressure P2, and calculating a target waste gate opening degree WG for preventing the intake system pressure and the engine output from excessively increasing based on the compressor driving force Pc, thereby driving the waste gate valve 34. Moreover, another control is also carried out which involves calculating an AVB opening degree AB for driving the ABV so as to prevent the throttle upstream pressure P2 from excessively increasing through unintended over supercharging.

A brief description is now given of the method of calculating the compressor driving force Pc disclosed in Japanese Patent Application Laid-open No. 2013-224596.

First, a description is given of a flow in the compressor 31 and the turbine 32. On this occasion, an output Pt [W] of the turbine 32 and a driving force Pc [W] of the compressor 31 are respectively calculated by using Expression (100) while considering the mass conservation law, the polytropic change, and adiabatic efficiencies, which are physical laws relating to states of the air.

Note that, Cp represents specific heat at constant pressure [kJ/(kg·K)]; Wt, turbine output per unit flow rate [J]; Wc, work by compressor [J]; κ, ratio of specific heat; Qt, mass flow rate of turbine [g/s]; Qcmp, mass flow rate of compressor (flow rate through compressor) [g/s]; R, gas constant [kJ/(kg·K)]; ηt, adiabatic efficiency of turbine; and ηc, adiabatic efficiency of compressor. Moreover, suffixes 1 to 4 for P: pressure [kPa] and T: absolute temperature [K] respectively represent 1: air inlet (atmosphere), 2: cylinder inlet (intake), 3: cylinder outlet, and 4: exhaust outlet.

$$P_t = Q_t \cdot w_t \cdot \eta_t = \qquad (100)$$

$$Q_t \cdot c_p T_3 \cdot \eta_t \left(1 - \left(\frac{P_4}{P_3}\right)^{\frac{\kappa-1}{\kappa}}\right) = Q_t \cdot \eta_t \cdot \frac{\kappa-1}{\kappa} RT_3 \left(1 - \left(\frac{P_4}{P_3}\right)^{\frac{\kappa-1}{\kappa}}\right)$$

-continued $$P_c = \frac{Q_{cmp} \cdot w_c}{\eta_c} = Q_{cmp} \cdot \frac{c_p T_1}{\eta_c}\left(\left(\frac{P_2}{P_1}\right)^{\frac{\kappa-1}{\kappa}} - 1\right) =$$

$$Q_{cmp} \cdot \frac{1}{\eta_c} \cdot \frac{\kappa-1}{\kappa} RT_1 \left(\left(\frac{P_2}{P_1}\right)^{\frac{\kappa-1}{\kappa}} - 1\right)$$

$$\left(\because c_p = \frac{\kappa}{\kappa-1}R\right)$$

Moreover, the turbine 32 and the compressor 31 have such a characteristic that the flow rate and turbine rotational speed tends to increase as a pressure ratio increases, and an exhaust pressure P3 is thus considered as a function of an exhaust gas flow rate Qex. Moreover, it is estimated that the exhaust gas flow rate Qex and the turbine output Pt are in an approximately proportional relationship in a normal operation region of the turbocharger for the motor vehicle, and the turbine output Pt is thus considered as a function of the exhaust gas flow rate Qex. Therefore, as expressed by Expression (101), the compressor driving force Pc is also considered as a function of the exhaust gas flow rate Qex.

$$Pc = Pt \cdot \eta m \propto Qex \qquad (101)$$

On this occasion, a relationship of "compressor passing flow rate Qcmp=intake air flow rate Qa" holds true in the steady state, and the compressor driving force Pc can be acquired based on Expression (102) by using the intake air flow rate Qa and the throttle upstream pressure P2.

$$P_c = Q_a \cdot \frac{\kappa}{\kappa-1} RT_1 \left(\left(\frac{P_2}{P_1}\right)^{\frac{\kappa-1}{\kappa}} - 1\right) \qquad (102)$$

According to this embodiment, the engine control described above is carried out in the ECU 100. Now, a detailed description is given of methods of calculating the throttle upstream pressure P2, which is the pressure between the compressor 31 and the throttle valve 4, the cylinder intake air amount Qc entering the cylinder 8, and the throttle intake air amount Qth passing through the throttle valve 4 based on the physical model of the intake system.

Figure 3:
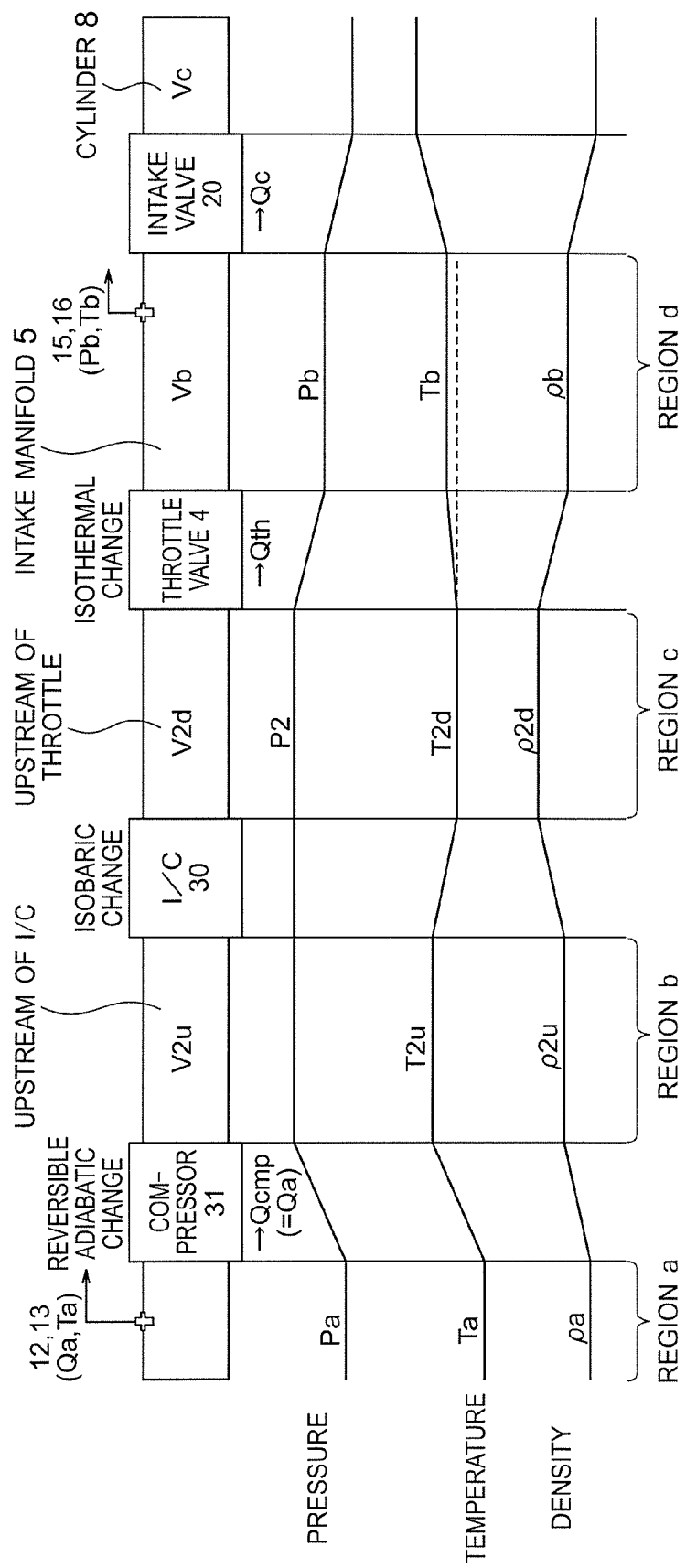
FIG. 3 is a diagram schematically illustrating state changes of air in respective regions and sensors for detecting the state changes in the control system for an engine equipped with a turbocharger according to the embodiment of the present invention.

FIG. 3 is a diagram schematically illustrating changes of the state (pressure, temperature, and density) of the air in respective regions of the control system for an engine equipped with a turbocharger and the sensors for detecting the changes of the state according to the embodiment of the present invention. In FIG. 3, the following definitions are provided (n: stroke number).

Qcmp(n): average of compressor intake air amount [g/s] over one stroke

Qa(n): average of AFS intake air amount [g/s] over one stroke

Qth(n): average of throttle intake air amount [g/s] over one stroke

Qc(n): average of cylinder intake air amount [g/s] over one stroke

ΔT(n): time [s] taken by one stroke

V2u: I/C upstream volume (volume from compressor to I/C) [m^3]

V2d: I/C downstream volume (volume from I/C to throttle valve) [m^3]

Vb: intake manifold volume (volume from throttle valve to intake valve) [m^3]

Vc: cylinder stroke volume per cylinder [m^3]

Pa(n): average of atmospheric pressure [kPa] over one stroke

P2(n): throttle upstream pressure (estimated value) [kPa]

Pb(n): average of intake manifold pressure [kPa] over one stroke

Ta(n): average of intake air temperature [K] over one stroke

T2u(n): average of I/C upstream temperature [K] over one stroke

T2d(n): average of I/C downstream temperature [K] over one stroke

Tb(n): average of intake manifold temperature [K] over one stroke

ρa(n): average of atmospheric density [g/m^3] over one stroke

ρ2u(n): average of I/C upstream density [g/m^3] over one stroke

ρ2d(n): average of I/C downstream density [g/m^3] over one stroke

ρb(n): average of intake manifold density [g/m^3] over one stroke

On this occasion, because the throttle upstream pressure is not measured, a description is now given of the physical model of the intake system for calculating the cylinder intake air amount Qc entering the cylinder 8 and the throttle intake air amount Qth passing through the throttle valve 4 on the assumption that the estimated value of the throttle upstream pressure P2 is already calculated.

A description is now given of the state change of FIG. 3. First, an upstream side (region "a") of the compressor 31 is open to the atmosphere, and basically has the atmospheric pressure Pa (sensor-measured value) and the intake air temperature Ta (sensor-measured value). A pressure loss by the air cleaner 3 and the like are conceivable in a strict sense, but those phenomena are ignored here. The air is compressed through a reversible adiabatic change in the compressor 31. Therefore, on the downstream side (region "b") of the compressor 31, the pressure and the temperature increase and the density also increases. When the air then passes through the I/C 30, if a pressure loss is ignored, only the temperature decreases, whereas the density increases, on the downstream side (region "c") of the I/C 30. Based on this consideration, a state change when the air passes through the I/C 30 is an isobaric change, and hence the pressures in the regions "b" and "c" are common to the throttle upstream pressure P2 (estimated value). However, the temperature is an I/C upstream temperature T2u in the region "b" and an I/C downstream temperature T2d in the region "c". Next, when the air passes through the throttle valve 4, the air is throttled and is then expanded and accumulated in the intake manifold 5. The change from the state before the throttle to the state after the throttle is an isothermal change, and hence only the pressure decreases, and the density also decreases. Note that, heat is received also from the engine side, and the temperature thus slightly increases. As a result, in a region "d", the pressure is the intake manifold pressure Pb (sensor-measured value), and the temperature is the intake manifold temperature Tb (sensor-measured value).

A description is now given of a method of calculating the density in each of the regions based on the above-mentioned state changes. Both the atmospheric pressure Pa and the intake air temperature Ta in the region "a" are the sensor-measured values, and the atmospheric density ρa, which is the density in the region "a", can be calculated based on a state equation represented by Expression (1). In Expression (1), R represents the gas constant.

$$P_a = \rho_a \cdot R \cdot T_a \quad \therefore \rho_a = \frac{P_a}{R \cdot T_a} \tag{1}$$

Then, regarding a method of calculating the density ρ2u in the region "b", the I/C upstream temperature T2u, which is the temperature in the region "b", has not been measured, and the state equation cannot be used for the calculation in this case. Incidentally, a change from a state before the compressor 31 to a state after the compressor 31 can be considered as a reversible adiabatic change, and Expression (2) representing the isentropic change holds true. Thus, the I/C upstream density ρ2u is calculated by using this equation, and, further, the I/C upstream temperature T2u is calculated by using a state equation similar to Expression (1). In Expression (2), κ is the ratio of specific heat.

$$\frac{T_a}{\rho_a^\kappa} = \frac{T_{2u}}{\rho_{2u}^\kappa} \quad \therefore \rho_{2u} = \rho_a \cdot \left(\frac{P_2}{P_a}\right)^{\frac{1}{\kappa}}, T_{2u} = \frac{P_2}{\rho_{2u} \cdot R} \tag{2}$$

Moreover, in the case where the compressor 31 is low in adiabatic efficiency ηad, and the state change before and after the compressor 31 cannot be considered as the reversible adiabatic change, the I/C upstream temperature T2u may be calculated by using Expression (3) that considers the adiabatic efficiency ρad, thereby calculating the I/C upstream density ρ2u.

$$T_{2u} = T_a \cdot \left\{ \frac{\left(\frac{P_2}{P_a}\right)^{\frac{\kappa-1}{\kappa}} - 1}{\eta_{ad}} + 1 \right\}, \rho_{2u} = \frac{P_2}{R \cdot T_{2u}} \tag{3}$$

$$\therefore \rho_{2u} = \rho_a \cdot \left(\frac{P_2}{P_a}\right) \cdot \frac{1}{\frac{\left(\frac{P_2}{P_a}\right)^{\frac{\kappa-1}{\kappa}} - 1}{\eta_{ad}} + 1}$$

Then, regarding a method of calculating the density ρ2d in the region "c", the I/C downstream temperature T2d, which is the temperature in the region "c", has not been measured, and the state equation cannot be used for the calculation. Moreover, since the air passes through the I/C 30, and the temperature thus decreases as described above. An amount of the decrease in the temperature is significantly influenced by cooling performance of the I/C 30 and outside air for the cooling, and it is difficult to simply estimate the temperature decrease amount. Then, when focus is paid on the fact that the change in the state before and after the throttle valve 4 is the isothermal change accompanying a slight change in the temperature, the temperature decrease amount can be approximated based on the intake manifold temperature Tb, which is the sensor-measured value, for example, based on Expression (4). Provisionally, values of coefficients Ka and Kb may be set respectively to 1.0 and 0.0, but the precision can be increased by acquiring approximation coefficients from measurement results.

$$T_{2d} = K_a \cdot T_b + K_b \tag{4}$$

After the I/C downstream temperature T2d is acquired, the density ρ2d in the region "c" is calculated by using a state equation represented as Expression (5).

$$P_2 = \rho_{2d} \cdot R \cdot T_{2d} \quad \therefore \rho_{2d} = \frac{P_2}{R \cdot T_{2d}} \quad (5)$$

A density ρb in the intake manifold 5 represented as the region "d" can be calculated by using a state equation represented by Expression (6) with the use of the intake manifold pressure Pb and the intake manifold temperature Tb, which are the sensor-measured values.

$$P_b = \rho_b \cdot R \cdot T_b \quad \therefore \rho_b = \frac{P_b}{R \cdot T_b} \quad (6)$$

The densities in the regions "a" to "d" can be calculated by using the above-mentioned method. A method of calculating the cylinder intake air amount Qc based on the AFS intake air amount Qa is now considered. In a region from the compressor 31 to the upstream of the intake valve (region "bcd" corresponding to a collection of the regions "b", "c", and "d", which is assumed to have a total volume Vall [m^3] and an average density ρave [g/m^3]), when the mass conservation law is applied to the fresh air, Expression (7) holds true. On this occasion, the compressor intake air amount Qcmp is considered to be equal to the AFS intake air amount Qa.

$$Q_a(n) \cdot \Delta T(n) - Q_c(n) \cdot \Delta T(n) = \{\rho_{ave}(n) - \rho_{ave}(n-1)\} \cdot V_{all} \quad (7)$$

On this occasion, the total volume Vall and the average density ρave are respectively defined by Expressions (8) and (9).

$$V_{all} = V_{2u} + V_{2d} + V_b \quad (8)$$

$$\rho_{ave}(n) = \frac{\rho_{2u}(n) \cdot V_{2u} + \rho_{2d}(n) \cdot V_{2d} + \rho_b(n) \cdot V_b}{V_{all}} \quad (9)$$

Then, the cylinder intake air amount Qc(n) can be calculated by using Expression (10) on the assumption that a volume efficiency with reference to the intake manifold is Kv(n). If the cylinder intake air amount Qc(n) is calculated by means of the S/D method, Expression (10) is used.

$$Q_c(n) \cdot \Delta T(n) = K_v(n) \cdot \rho_b(n) \cdot V_c \quad (10)$$

Incidentally, the density in the region "bcd" is ρave and the volume thereof is Vall, and air of ρave×Vall in the mass thus exists in this region. If the density of the air existing in the region "bcd" is the intake manifold density ρb, the relationship thereof with a volume (hereinafter referred to as "virtual intake manifold volume") Vb' occupied by air having the same mass is represented by Expression (11).

$$\rho_{ave}(n) \cdot V_{all} = \rho_b(n) \cdot V_b'(n) \quad (11)$$

Expression (12) is acquired by substituting Expression (11) to Expression (7).

$$Q_a(n) \cdot \Delta T(n) - Q_c(n) \cdot \Delta T(n) = \rho_{ave}(n) \cdot V_{all} - \rho_{ave}(n-1) \cdot V_{all} \quad (12)$$

$$= \rho_b(n) \cdot V_b'(n) - \rho_b(n-1) \cdot V_b'(n-1)$$

In the following, the region "bcd" is assumed to have the intake manifold density ρb as its density and the virtual intake manifold volume Vb' as its volume. Expression (13) is acquired by substituting Expression (10) to Expression (12) and eliminating the intake manifold density ρb.

$$Q_a(n) \cdot \Delta T(n) - Q_c(n) \cdot \Delta T(n) = \quad (13)$$
$$\frac{Q_c(n) \cdot \Delta T(n)}{K_v(n) \cdot V_c} \cdot V_b'(n) - \frac{Q_c(n-1) \cdot \Delta T(n-1)}{K_v(n-1) \cdot V_c} \cdot V_b'(n-1)$$

Further, Expression (14) is acquired by solving Expression (13) in terms of Qc(n)·ΔT(n).

$$Q_c(n) \cdot \Delta T(n) = \quad (14)$$
$$\frac{K_v(n) \cdot V_c}{K_v(n) \cdot V_c + V_b'(n)} \cdot \frac{V_b'(n-1)}{K_v(n-1) \cdot V_c} \cdot Q_c(n-1) \cdot \Delta T(n-1) +$$
$$\frac{K_v(n) \cdot V_c}{K_v(n) \cdot V_c + V_b'(n)} \cdot Q_a(n) \cdot \Delta T(n)$$

Further, Expression (15) is acquired by multiplying both sides of Expression (14) by Vb'(n)/(Kv(n)·Vc) and rearranging the expression.

$$\frac{V_b'(n)}{K_v(n) \cdot V_c} \cdot Q_c(n) \cdot \Delta T(n) = \quad (15)$$
$$\frac{V_b'(n)}{K_v(n) \cdot V_c + V_b'(n)} \cdot \frac{V_b'(n-1)}{K_v(n-1) \cdot V_c} \cdot Q_c(n-1) \cdot \Delta T(n-1) +$$
$$\frac{K_v(n) \cdot V_c}{K_v(n) \cdot V_c + V_b'(n)} \cdot \frac{V_b'(n)}{K_v(n) \cdot V_c} \cdot Q_a(n) \cdot \Delta T(n)$$

Expression (17) is acquired by substituting an intermediate variable defined as Expression (16) to Expression (15), and the cylinder intake air amount Qc can be calculated by using Expression (17) based on the AFS intake air amount Qa.

$$W(n) = \frac{V_b'(n)}{K_v(n) \cdot V_c}, \quad (16)$$
$$K' = \frac{V_b'(n)}{K_v(n) \cdot V_c + V_b'(n)},$$
$$1 - K' = \frac{K_v(n) \cdot V_c}{K_v(n) \cdot V_c + V_b'(n)}$$

$$W(n) \cdot Q_c(n) \cdot \Delta T(n) = \quad (17)$$
$$K' \cdot W(n-1) \cdot Q_c(n-1) \cdot \Delta T(n-1) + (1 - K') \cdot W(n) \cdot Q_a(n) \cdot \Delta T(n)$$

For example, when Expression (17) derived as described above is calculated in interrupt processing carried out at each certain preset crank angle of the crankshaft synchronized with the rotation of the engine 1, Expression (17) serves as a calculation equation of a digital low-pass filter. In other words, the intake system of the engine 1 can be considered as a first-order lag element.

The volume efficiency Kv(n) of the standard of the intake manifold is necessary to use Expression (17), and Kv needs to be adapted in advance by using Expression (10). Regarding Kv, if a mechanism such as VVT or VVL, which changes the volume efficiency of the standard of the intake manifold, does not exist, an adaptation workload and the number of maps can be reduced. However, if the intake/exhaust VVT or the like is used, the adaptation workload and the number of maps become enormous (Kv calculated by using maps is hereinafter referred to as "map Kv"). Thus, a description is now given of a method of calculating Kv in real time by using the AFS intake air amount Qa and the intake manifold density ρb. In other words, Expression (18) is acquired by substituting Expression (10) to Expression (12), eliminating the cylinder intake air amount Qc, and solving Expression (12) in terms of Kv.

$$Q_a(n) \cdot \Delta T(n) - K_v(n) \cdot \rho_b(n) \cdot V_c = \quad (18)$$
$$\rho_b(n) \cdot V_b'(n) - \rho_b(n-1) \cdot V_b'(n-1)$$
$$\therefore K_v(n) = \frac{Q_a(n) \cdot \Delta T(n) - \{\rho_b(n) \cdot V_b'(n) - \rho_b(n-1) \cdot V_b'(n-1)\}}{\rho_b(n) \cdot V_c}$$

The volume efficiency Kv of the standard of the intake manifold can be calculated in real time in this way (hereinafter referred to as "real time Kv"). Note that, the real time Kv calculated by using Expression (18) may include a phase difference generated when averaging the sensor output values, and a noise caused by a small measurement noise. Therefore, the noise components are attenuated by applying filtering to the sensor output values used for Expression (18) and the real time Kv calculated by following Expression (18). Then, it is efficient that Expression (17) is calculated by using Kv having the attenuated noise component after the filtering. Note that, as the filtering for attenuating the noise components, low-pass filtering, processing of calculating a simple moving average for values in the past several strokes, and processing of calculating a weighted moving average (average of differently weighted values of data in the past several strokes) can be used. Further, the map Kv may be corrected by learning based on the real time Kv calculated in the steady state operation.

A description is now given of a method of calculating the throttle intake air amount Qth required for the feedback control for the target throttle opening degree TPt to be carried out to highly precisely realize the target throttle intake air amount Qtht described above. In the case of the control system for an engine equipped with a turbocharger, the throttle intake air amount Qth during the steady state operation is considered to be equal to both of the AFS intake air amount Qa and the cylinder intake air amount Qc. However, in a transient operation, a response lag occurs, and the throttle intake air amount Qth cannot be considered to be equal to the AFS intake air amount Qa or the cylinder intake air amount Qc. Thus, the mass conservation law is newly applied to the fresh air with respect to the region "d" of FIG. 3 as represented by Expression (19), thereby deriving the throttle intake air amount Qth.

$$Q_{th}(n) \cdot \Delta T(n) - Q_c(n) \cdot \Delta T(n) = \{\rho_b(n) - \rho_b(n-1)\} \cdot V_b \quad (19)$$

Expression (20) is acquired by substituting Expression (10) to Expression (19) and eliminating ρb.

$$Q_{th}(n) \cdot \Delta T(n) - Q_c(n) \cdot \Delta T(n) = \quad (20)$$
$$\left\{ \frac{Q_c(n) \cdot \Delta T(n)}{K_v(n)} - \frac{Q_c(n-1) \cdot \Delta T(n-1)}{K_v(n-1)} \right\} \cdot \frac{V_b}{V_c}$$

In Expression (20), Expression (22) is acquired by defining an intermediate variable in Expression (21) and rearranging Expression (21).

$$K = \frac{V_b}{V_b + K_v(n) \cdot V_c} \quad (21)$$

$$\frac{Q_c(n) \cdot \Delta T(n)}{K_v(n)} = K \cdot \frac{Q_c(n-1) \cdot \Delta T(n-1)}{K_v(n-1)} + (1-K) \cdot \frac{Q_{th}(n) \cdot \Delta T(n)}{K_v(n)} \quad (22)$$

Expression (23) is acquired by transforming Expression (22), and the throttle intake air amount Qth can be calculated by using Expression (23) with use of the cylinder intake air amount Qc calculated by using Expression (17) and the real time Kv calculated by using Expression (18).

$$\frac{Q_{th}(n) \cdot \Delta T(n)}{K_v(n)} = \quad (23)$$
$$\frac{1}{1-K} \cdot \frac{Q_c(n) \cdot \Delta T(n)}{K_v(n)} - \frac{K}{1-K} \cdot \frac{Q_c(n-1) \cdot \Delta T(n-1)}{K_v(n-1)}$$

The cylinder intake air amount Qc and the throttle intake air amount Qth can be calculated based on the AFS intake air amount Qa by considering the physical model of the intake system as described above.

A description is now given of a method of estimating the throttle upstream pressure P2. The above-mentioned calculation of the cylinder intake air amount Qc and the throttle intake air amount Qth assumes that the throttle upstream pressure P2 has been estimated. Therefore, the cylinder intake air amount Qc and the throttle intake air amount Qth thus need to be calculated after the estimation of the throttle upstream pressure P2 described below. First, Expression (10) is substituted to Expression (7) to calculate the average density ρave in the region "bcd" which is on the downstream side of the compressor, thereby acquiring Expression (24).

$$\rho_{ave}(n) = \rho_{ave}(n-1) + \frac{Q_a(n) \cdot \Delta T(n) - K_v(n) \cdot \rho_b(n) \cdot V_c}{V_{all}} \quad (24)$$

The volume efficiency Kv (n) of the standard of the intake manifold used here needs to be calculated not from the above-mentioned real time Kv, but from the map Kv adapted in advance. Further, the map Kv may be corrected by learning based on the real time Kv calculated in the steady state operation as described above. The average density ρave(n) can be calculated from the AFS intake air amount Qa(n), the intake manifold pressure Pb(n), and the previous average density ρave(n−1) by using Expression (24). Note that, an initial value ρave(0) of the average density may be the intake manifold density or the atmospheric density before the engine starts.

Expression (9) is transformed to acquire Expression (25) in order to calculate the density upstream of the throttle from the average density ρave(n).

$$\rho_{2u}(n) \cdot V_{2u} + \rho_{2d}(n) \cdot V_{2d} = \rho_{ave}(n) \cdot V_{all} - \rho_b(n) \cdot V_b \quad (25)$$

The right side of Expression (25) is known, and a case where ρ2u and ρ2d on the left side are derived by using P2 is considered. A relationship represented by Expression (26) is derived by substituting Expressions (2) and (5) to Expression (25).

$$\rho_a \cdot \left(\frac{P_2}{P_a}\right)^{\frac{1}{k}} \cdot V_{2u} + \frac{P_2}{R \cdot T_{2d}} \cdot V_{2d} = \rho_{ave}(n) \cdot V_{all} - \rho_b(n) \cdot V_b \quad (26)$$

If P2 can be calculated by using Expression (26), this situation means that P2 is calculated while influence of the intercooler is taken into consideration. Note that, if the influence of the intercooler is not taken into consideration, V2d only needs to be set to zero.

Figure 19:
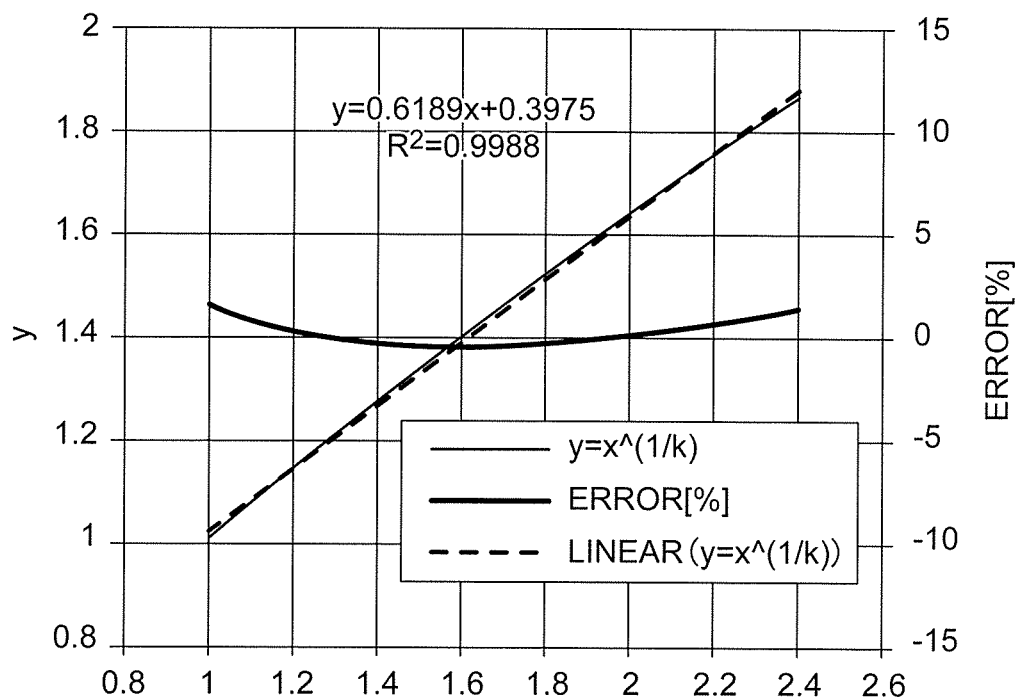
FIG. 19 is a graph showing Expression 27 in a range of $1.0 \leq x \leq 2.4$ and a linear approximation line.

On this occasion, a problem is a method of calculating P2 by using Expression (26). Expression (26) includes an exponential term and cannot be solved as a simple equation, but, for example, can be solved by a numerical solution by means of the Newton method. However, this method iteratively carries out calculation and may increase a calculation amount, and hence this method is not suitable for implementation on the ECU for engine control. Therefore, a description is given of a simpler method. If a possible range of P2/Pa is considered to be approximately 1.0 to 2.4, a graph of Expression (27) in the range of $1.0 \leq x \leq 2.4$ and a linear approximation line thereof are shown as in FIG. 19.

$$y = (x)^{\frac{1}{\kappa}} \quad (27)$$

If the range is limited to this range, the linear approximation having an error of approximately ±1.0[%] can be carried out, and Expression (28) is acquired through the approximation.

$$\left(\frac{P_2}{P_a}\right)^{\frac{1}{\kappa}} = K_c \cdot \frac{P_2}{P_a} + K_d \quad (28)$$

When Expression (28) is substituted to Expression (26), P2 can be calculated by using Expression (29).

$$P_2 = \frac{\rho_{ave}(n) \cdot V_{all} - \rho_b(n) \cdot V_b - \rho_a \cdot K_d \cdot V_{2u}}{\rho_a \cdot K_c \cdot \frac{V_{2u}}{P_a} + \frac{V_{2d}}{R \cdot T_{2d}}} \quad (29)$$

It should be understood that P2 may be calculated by approximating Expression (27) by a quadratic or higher order function and analytically solving the equation. Moreover, when the adiabatic efficiency read of the compressor 31 is taken into consideration, Expression (3) instead of Expression (2) is substituted to Expression (25), but, also in this case, P2 can be calculated by approximating by a linear function or a quadratic or higher order function.

Incidentally, the thus estimated P2 is acquired by a balance calculation, and it is considered that an error usually accumulates. Thus, P2 can be highly precisely estimated by correcting the estimated P2 by means of a method described below. A volumetric flow rate calculation equation (for compressible fluid) for the so-called orifice flow meter before and after the throttle valve 4 is represented by Expression (30).

$$Q_{thv} = \alpha_{2d} \cdot CA_t \cdot \sqrt{\frac{2}{\kappa - 1}\left[\left(\frac{P_b}{P_2}\right)^{\frac{2}{\kappa}} - \left(\frac{P_b}{P_2}\right)^{\frac{\kappa+1}{\kappa}}\right]} \quad (30)$$

On this occasion, a throttle intake air amount (volumetric flow rate) is represented as Qthv [L/s], the speed of sound upstream of the throttle is represented as α2d [m/s], and an effective opening area of the throttle is represented as CAt [cm^2]. Note that, the throttle intake air amount (volumetric flow rate) Qthv [L/s] can be calculated from the throttle intake air amount Qth [g/s] and the throttle upstream density ρ2d [g/m^3] (estimated values).

On this occasion, if non-dimensional flow rate σ[ ] is defined by Expression (31), Expression (30) is simply described as Expression (32).

$$\sigma = \sqrt{\frac{2}{\kappa - 1}\left[\left(\frac{P_b}{P_2}\right)^{\frac{2}{\kappa}} - \left(\frac{P_b}{P_2}\right)^{\frac{\kappa+1}{\kappa}}\right]} \quad (31)$$

$$Q_{thv} = \alpha_{2d} \cdot CA_t \cdot \sigma \quad (32)$$

Note that, the speed of sound α2d [m/s] upstream of the throttle can be calculated by using Expression (33) using the throttle upstream temperature T2d [K].

$$\alpha_{2d} = \sqrt{\kappa R T_{2d}} \quad (33)$$

On this occasion, when the throttle intake air amount (volumetric flow rate) Qthv, the speed of sound α2d upstream of the throttle, and the non-dimensional flow rate σ are provided, the effective opening area CAt of the throttle can be calculated by the following expression acquired by transforming Expression (32).

$$CA_t = \frac{Q_{thv}}{\alpha_{2d} \cdot \sigma} \quad (34)$$

According to Prior Application 2, if the atmospheric pressure and the other physical amounts are correct values, the relationship between the throttle opening degree and the effective opening area is approximately a one-on-one relationship. However, if the actual atmospheric pressure and the estimated atmospheric pressure used for the calculation are different from each other, a deviation is generated in the relationship. As the result, variation occurs in the relationship between the throttle opening degree and the effective opening area. Therefore, in Prior Application 2, there is disclosed a method of detecting the variation to correct the estimated atmospheric pressure, thereby increasing the estimation precision of the atmospheric pressure. Thus, the estimated P2 can be corrected to a more precise P2 by replacing the atmospheric pressure in the method according to Prior Application 2 by the throttle upstream pressure to apply the method to this embodiment.

A control apparatus for an internal combustion engine according to Prior Application 2 has a feature in that the control apparatus includes operation state detection means for detecting an operation state of the internal combustion engine, target intake air flow rate calculation means for calculating a target intake air flow rate based on the operation state of the internal combustion engine, a throttle provided in an intake passage of the internal combustion engine, throttle opening degree control means for controlling a throttle opening degree of the throttle to change an effective opening area of the intake passage, thereby variably controlling an intake air amount to be supplied to the internal combustion engine, throttle opening degree detection means for detecting the throttle opening degree, pressure detection means for detecting a pressure in the throttle on the internal combustion engine side as an intake manifold pressure, intake air temperature detection means for detecting an intake air temperature of the throttle, intake air flow rate detection means for detecting an intake air flow rate supplied to the internal combustion engine, and atmospheric pressure estimation means for estimating the atmospheric pressure to be applied to calculation of a control parameter of the internal combustion engine. The atmospheric pressure estimation means includes effective opening area calculation means for calculating the effective opening area corresponding to the throttle opening degree based on the estimated atmospheric pressure, the intake air flow rate, the intake manifold pressure, and the intake air temperature, a relationship map between the set effective opening area and the throttle opening degree, throttle opening degree learning value calculation means for calculating a learning value in a relationship between the effective opening area and the throttle opening degree, effective opening area/throttle opening degree relationship range determination means for determining whether or not the relationship between the effective opening area and the throttle opening degree falls within a range set in advance, error dispersion calculation means for calculating an error dispersion based on an error between the relationship map between the effective opening area and the throttle opening degree and a relationship map between the effective opening area and the throttle opening degree corrected based on the throttle opening degree learning value calculation means, dispersion range determination means for determining whether or not the error dispersion falls within a range set in advance, atmospheric pressure estimated value update means for updating the atmospheric pressure estimated value when the relationship between the effective opening area and the throttle opening degree is out of the range and when the error dispersion is out of the range, and a target throttle opening degree calculation part for calculating a target throttle opening degree by using the atmospheric pressure estimated value updated by the atmospheric pressure estimated value update means. The throttle opening degree is controlled to the target throttle opening degree. The control apparatus for an internal combustion engine according to Prior Application 2 configured in this way updates the atmospheric pressure estimated value by using the learning range of the throttle opening degree and the statistical dispersion of the relationship between the throttle opening degree and the effective opening area as determination criteria while learning the relationship between the throttle opening degree and the effective opening area corresponding to a machine difference dispersion of the throttle, thereby being capable of precisely estimating the atmospheric pressure in a wide operation range while learning the machine difference dispersion of the throttle. Thus, as described above, the estimated P2 can be corrected to a more precise P2 by replacing the atmospheric pressure in the method according to Prior Application 2 by the throttle upstream pressure to apply the method to this embodiment.

Figure 4:
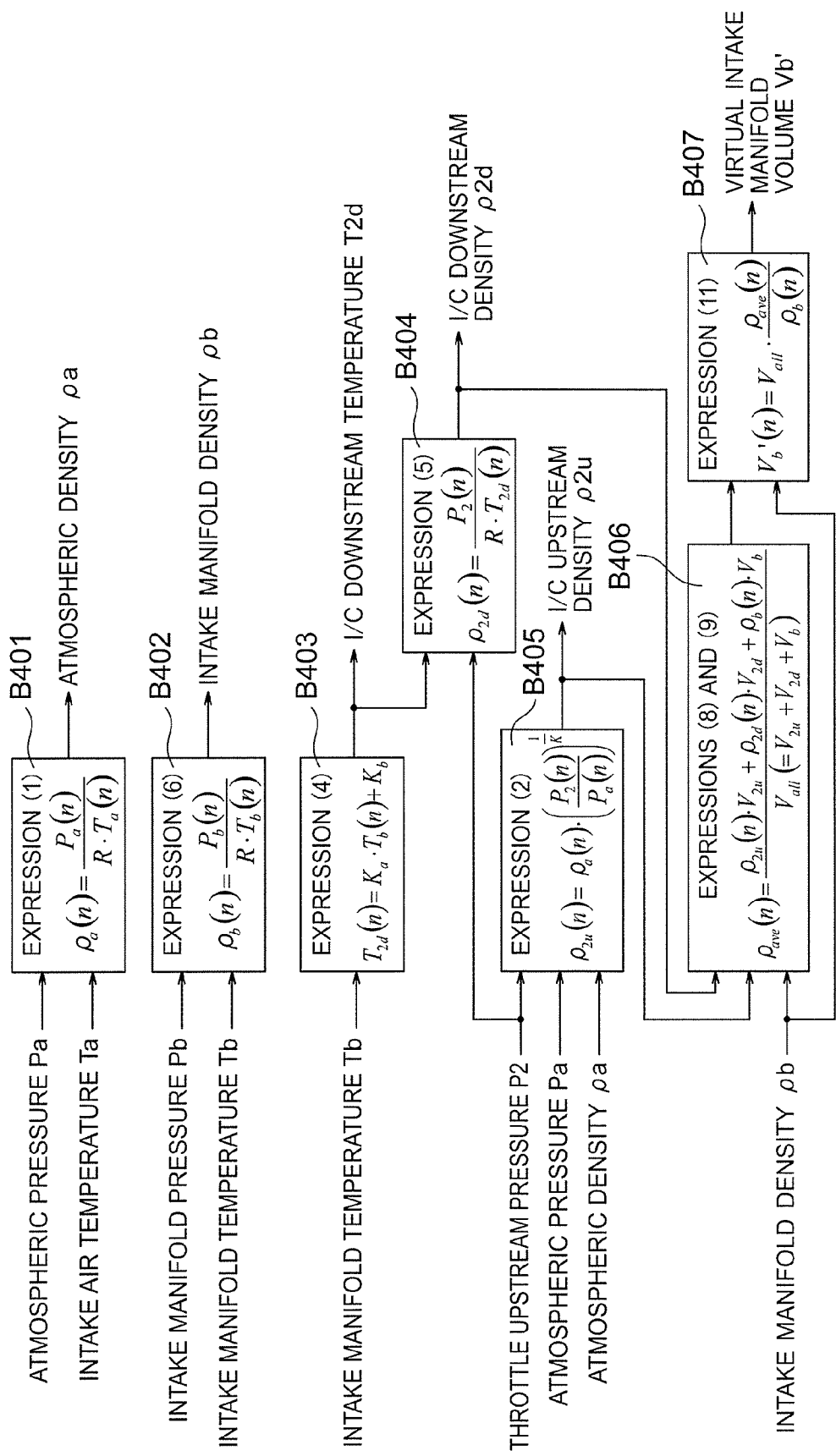
FIG. 4 is a control block diagram for calculating a virtual intake manifold volume according to the embodiment of the present invention.
Figure 5:
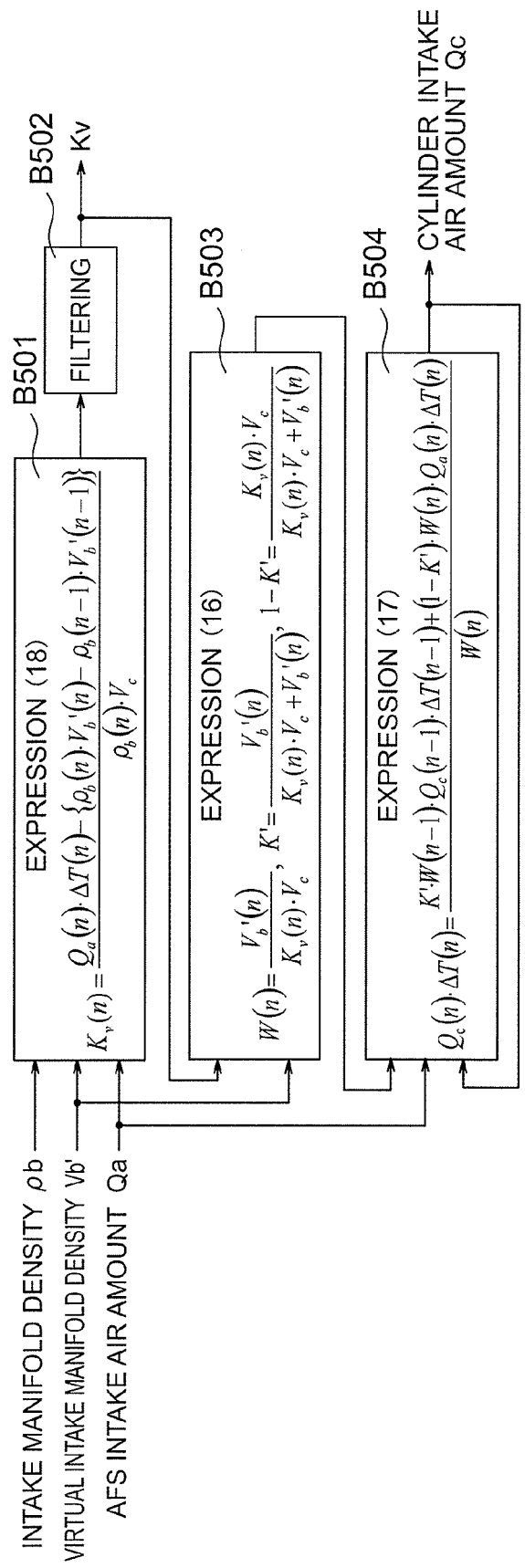
FIG. 5 is a control block diagram for calculating a cylinder intake air amount according to the embodiment of the present invention.
Figure 6:
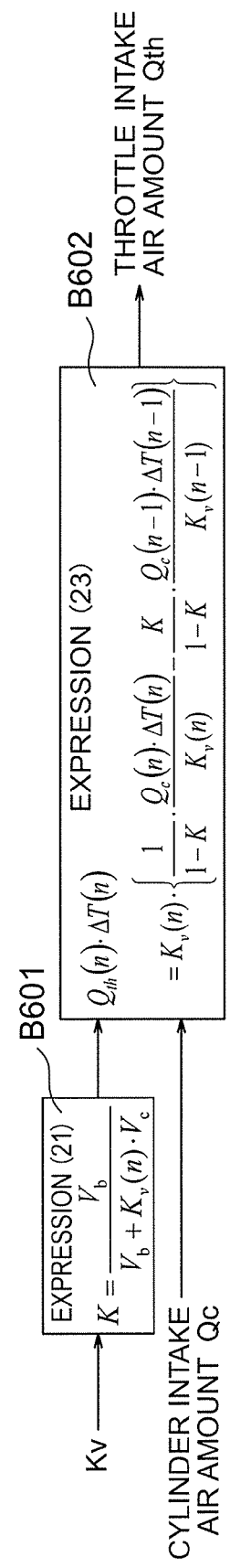
FIG. 6 is a control block diagram for calculating a throttle intake air amount according to the embodiment of the present invention.

Referring to FIGS. 4 to 8, calculation contents to be actually carried out based on the physical model of the intake system in the ECU 100 are now specifically described. First, a description is given of a physical model of the intake system for calculating the cylinder intake air amount Qc entering the cylinder 8 and the throttle intake air amount Qth passing through the throttle valve 4 on the assumption that the estimated value of the throttle upstream pressure P2 is already calculated. FIG. 4 is a control block diagram for calculating a virtual intake manifold volume of the control system for an engine equipped with a turbocharger according to the embodiment of the present invention, FIG. 5 is a control block diagram for calculating the cylinder intake air amount, and FIG. 6 is a control block diagram for calculating the throttle intake air amount.

First, a description is given of a method of calculating the virtual intake manifold volume Vb' illustrated in FIG. 4. This calculation is carried out in interrupt processing (hereinafter referred to as "B05 interrupt processing") to be carried out at each preset constant crank angle (for example, BTDC 5 degCA) of the crankshaft synchronized with the rotation of the engine 1. Moreover, some of the following calculations use an average of values detected by the sensor over one stroke. The average can be acquired by detecting a sensor output value at each preset constant interval (for example, 1 millisecond or 10 degCA) and calculating the average of all the sensor detection values from a start of the previous B05 interrupt processing to a start of the current B05 interrupt processing.

In Block B401, the atmospheric density $\rho a(n)$ is calculated based on Expression (1) from the atmospheric pressure Pa(n) and the intake air temperature Ta(n). In Block B402, the intake manifold density $\rho b(n)$ is calculated based on Expression (6) from the intake manifold pressure Pb(n) and the intake manifold temperature Tb(n). Then, in Block B403, the I/C downstream temperature T$2d$(n) is calculated based on Expression (4) from the intake manifold temperature Tb(n). Note that, the values of the coefficients Ka and Kb used for Expression (4) may be respectively set to 1.0 and 0.0 provisionally, but the precision can be increased by acquiring approximation coefficients from measurement results. Then, in Block B404, the I/C downstream density $\rho 2d$ (n) is calculated based on Expression (5) from the I/C downstream temperature T$2d$(n) calculated in Block B403 and the throttle upstream pressure P2(n). In Block B405, the I/C upstream density $\rho 2u$(n) is calculated based on Expression (2) from the throttle upstream pressure P2(n), the atmospheric pressure Pa(n), and the atmospheric density $\rho a$(n) calculated before. On this occasion, an exponential function needs to be calculated to calculate Expression (2), but highly precise calculation leads to a high calculation load. Thus, values calculated independently in advance may be stored as table values, and a value corresponding to the operation state in use may be searched for and used. Moreover, if the adiabatic efficiency $\eta ad$ of the compressor 31 is taken into consideration, Expression (3) may be used in place of Expression (2).

In Block B406, the average density $\rho ave$ (n) is calculated based on Expressions (8) and (9) from the I/C upstream density $\rho 2u$(n), the I/C downstream density $\rho 2d$(n), and the intake manifold density $\rho b$(n). Further, in Block B407, the virtual intake manifold volume Vb'(n) is calculated based on Expression (11) by using the average density $\rho ave$(n) calculated in Block B406 and the intake manifold density $\rho b$(n). The virtual intake manifold volume Vb'(n) can be acquired from the existing sensor detection values by carrying out the calculation in the sequence described above.

A description is now given of a method of calculating the cylinder intake air amount illustrated in FIG. 5. Note that, the calculation timing thereof is after the calculation of the virtual intake manifold volume Vb'(n) in the B05 interrupt processing, and the period $\Delta T(n)$ corresponding to one stroke can be calculated from the difference between the previous B05 interrupt processing start time and the current B05 interrupt processing start time. Moreover, (n−1) means a value calculated in the previous B05 interrupt processing.

In Block B501, the real time Kv is calculated based on Expression (18) from intake manifold densities $\rho b$(n) and $\rho b$(n−1), virtual intake manifold volumes Vb'(n) and Vb'(n−1), and the AFS intake air amount Qa(n). Then, in Block B502, filtering for attenuating noise components is carried out. Note that, as the filtering for attenuating the noise components, low-pass filtering, processing of calculating a simple moving average for values in the past several strokes, and processing of calculating a weighted moving average (average of differently weighted values of data in the past several strokes) can be used. The real time Kv after the filtering can be calculated in this way.

Then, in Block B503, the intermediate variable represented by Expression (16) is calculated based on the real time Kv and the virtual intake manifold volume Vb'(n). The real time Kv is used herein, but without being limited to the real time Kv, a map KV calculated as follows may be used. Kv values adapted in advance by using Expression (10) are stored as a map, and a map value corresponding to the operation state in use is searched for. Further, the map Kv may be corrected by learning based on the real time Kv calculated in the steady state operation. Then, in Block B504, the cylinder intake air amount Qc(n) is calculated based on Expression (17) from the intermediate variable calculated in Block B503, the AFS intake air amount Qa(n), and the previous cylinder intake air amount Qc(n−1). The cylinder intake air amount Qc can be calculated from the AFS intake air amount Qa based on the physical model of the intake system in this way.

A description is now given of a method of calculating the throttle intake air amount illustrated in FIG. 6. Note that, the calculation timing thereof is after the calculation of the cylinder intake air amount Qc(n) in the B05 interrupt processing.

In Block B601, the intermediate variable is calculated based on Expression (21) from the real time Kv or the map Kv. Then, in Block B602, the throttle intake air amount Qth is calculated based on Expression (23) from the intermediate variable and cylinder intake air amounts Qc(n) and Qc(n−1).

As described above, when the calculation is carried out in the sequence illustrated in FIGS. 4 to 6, the physical model of the intake system can be installed in the ECU 100 to be used in the engine control system. The cylinder intake air amount Qc and the throttle intake air amount Qth calculated in this way can be used to highly precisely control the output torque, the air-to-fuel ratio, the ignition timing, and the like in the control system for an engine equipped with a turbocharger. Also in a control system for an engine equipped with a mechanical supercharger or an electric charger instead of a turbocharger, the cylinder intake air amount Qc and the throttle intake air amount Qth can be calculated in completely the same way as long as the system has the configuration of the intake system illustrated in FIG. 3 (the compressor, the I/C, and the throttle valve in this order from the upstream).

Figure 7:
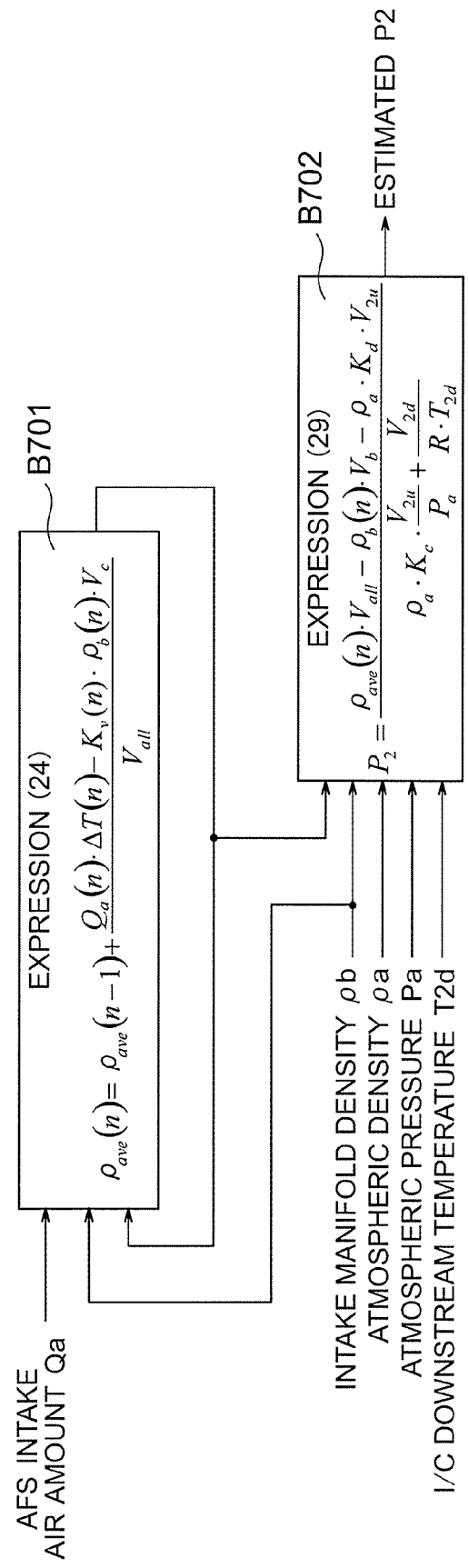
FIG. 7 is a control block diagram for calculating an estimated value (estimated P2) of a throttle upstream pressure according to the embodiment of the present invention.
Figure 8:
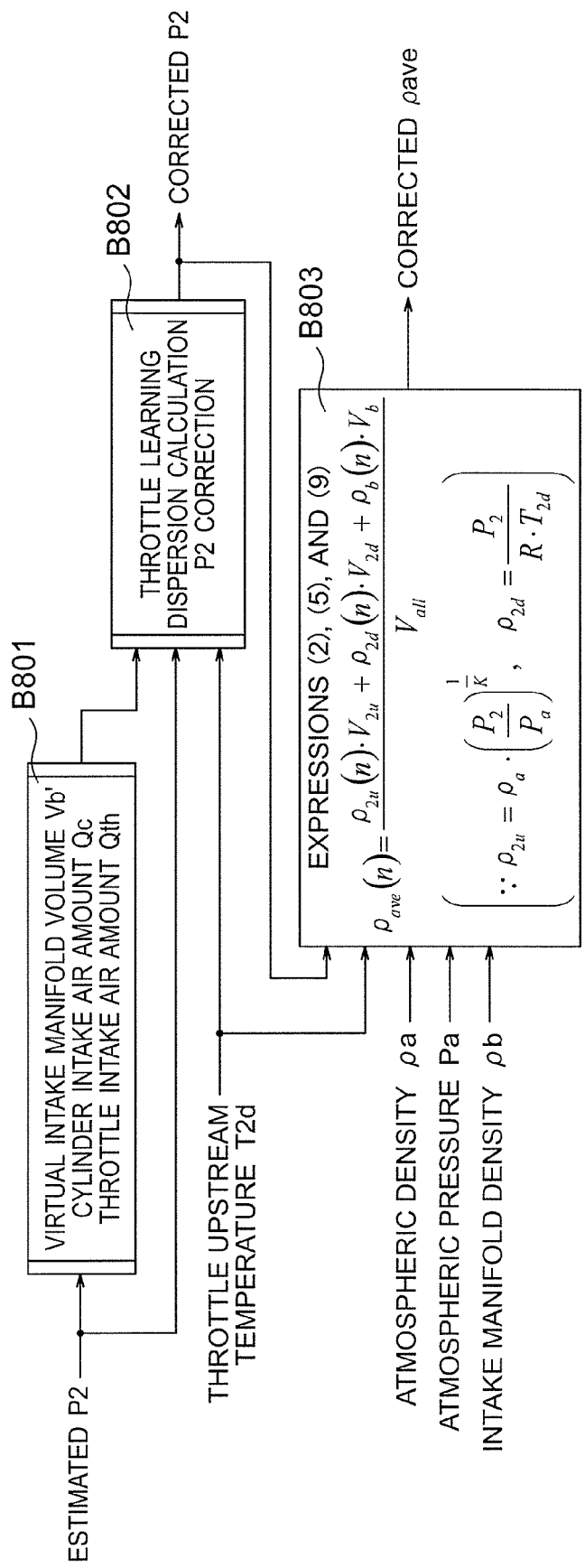
FIG. 8 is a control block diagram for calculating a corrected P2 and a corrected pave according to the embodiment of the present invention.

A description is now given of the physical model of the intake system for calculating the estimated value of the throttle upstream pressure P2. FIG. 7 is a control block diagram for calculating an estimated value of the throttle upstream pressure P2 (hereinafter referred to as "estimated P2") of the control system for an engine equipped with a turbocharger according to the embodiment of the present invention. FIG. 8 is a control block diagram for calculating a corrected P2 and a corrected pave.

A description is now given of a method of calculating the estimated value of the throttle upstream pressure P2 illustrated in FIG. 7. Note that, the calculation timing thereof is before the calculation of the virtual intake manifold volume Vb'(n), the cylinder intake air amount Qc(n), the throttle intake air amount Qth(n), and the like in the B05 interrupt processing. Note that, Blocks B401 (calculation of atmospheric density ρa), B402 (calculation of intake manifold density ρb), and B403 (calculation of I/C downstream temperature T2d) of FIG. 4 are carried out in advance.

In Block B701, the average density ρave(n) is calculated based on Expression (24) from the AFS intake air amount Qa(n), the intake manifold density ρb(n), the previous average density ρave(n−1), and the map Kv. Then, in Block B702, the estimated P2 is calculated based on Expression (29) from the average density ρave(n), the intake manifold density ρb(n), the atmospheric density ρa(n), the atmospheric pressure Pa(n), and the I/C downstream temperature T2d(n).

A description is now given of a method of calculating the corrected P2 and the corrected pave illustrated in FIG. 8. Note that, the calculation timing thereof is after the calculation of the estimated P2. In Block B801, the virtual intake manifold volume Vb'(n), the cylinder intake air amount Qc(n), and the throttle intake air amount Qth(n) are calculated. The calculations described above referring to FIGS. 4 to 6 are carried out for those values. Then, in Block B802, processing of throttle learning, a dispersion calculation, and a P2 correction are carried out, and a detailed description thereof is later given. The estimated P2 is corrected by the processing described later to calculate a more precise estimated value of the throttle upstream pressure P2 as the corrected P2. Further, in Block B803, the corrected ρave(n) is calculated based on Expressions (2), (5), and (9) from the corrected P2(n), the throttle upstream temperature T2d(n), the atmospheric density ρa(n), the atmospheric pressure Pa(n), and the intake manifold density ρb(n). An estimation precision of the estimated P2 can be increased by using the corrected ρave(n) as the previous average density ρave(n−1) of FIG. 7 at the next calculation timing. Moreover, when the adiabatic efficiency ηad of the compressor 31 is taken in consideration, Expression (3) may be used in place of Expression (2).

Referring to FIGS. 9 to 18, a detailed description is now given of the processing of the throttle learning, the dispersion calculation, and the P2 correction carried out in Block B802 of FIG. 8.

Figure 9:
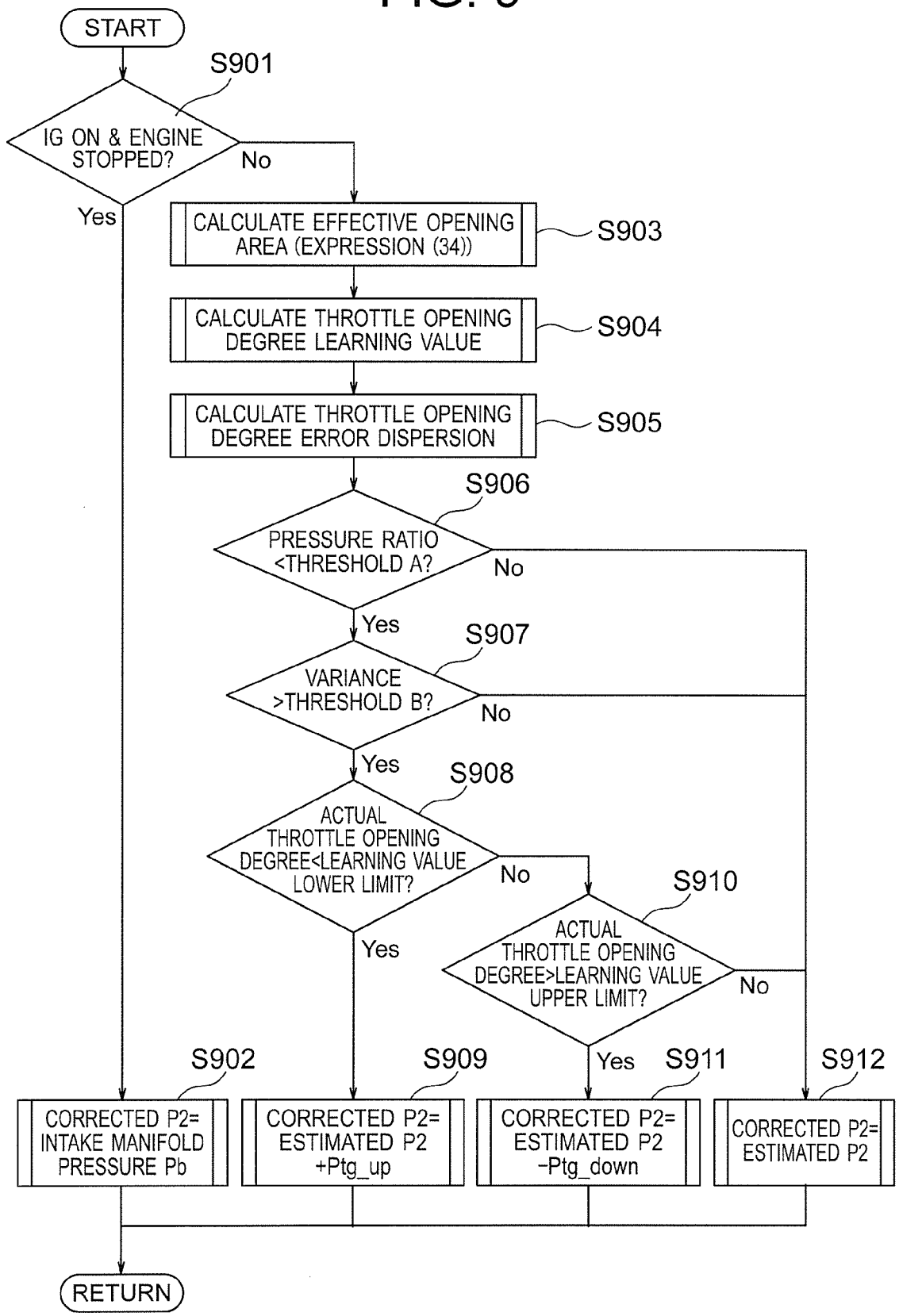
FIG. 9 is a flowchart illustrating entire P2 correction processing according to the embodiment of the present invention.
Figure 10:
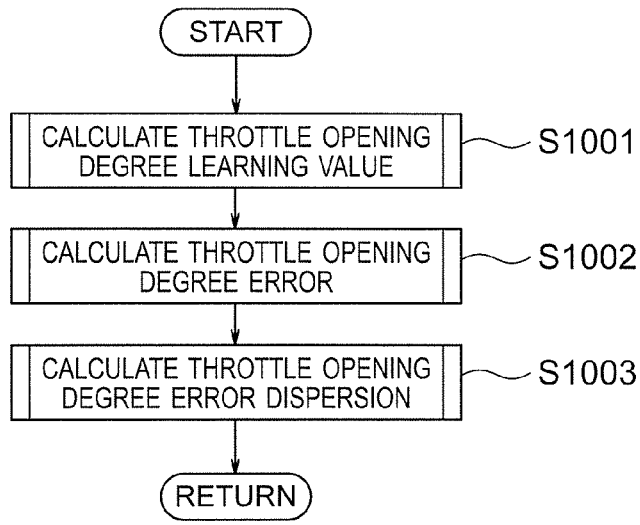
FIG. 10 is a flowchart for calculating a dispersion of a throttle opening degree error according to the embodiment of the present invention.

FIG. 9 is a flowchart illustrating the entire P2 correction processing. First, in Step S901 of the flowchart of FIG. 9, whether or not an IG-S/W is turned on and the engine is stopped is determined. When the determination is Yes, the processing proceeds to Step S902 where the intake manifold pressure Pb is substituted as the corrected P2, and the processing is finished. Note that, the atmospheric pressure, the intake manifold pressure, and the throttle upstream pressure are considered to be equal to one another when the engine is stopped, and hence the atmospheric pressure Pa may be substituted in place of the intake manifold pressure Pb. In Step S901, when the determination is No, it is determined that the engine is operating, and the processing proceeds to Step S903.

Figure 11:
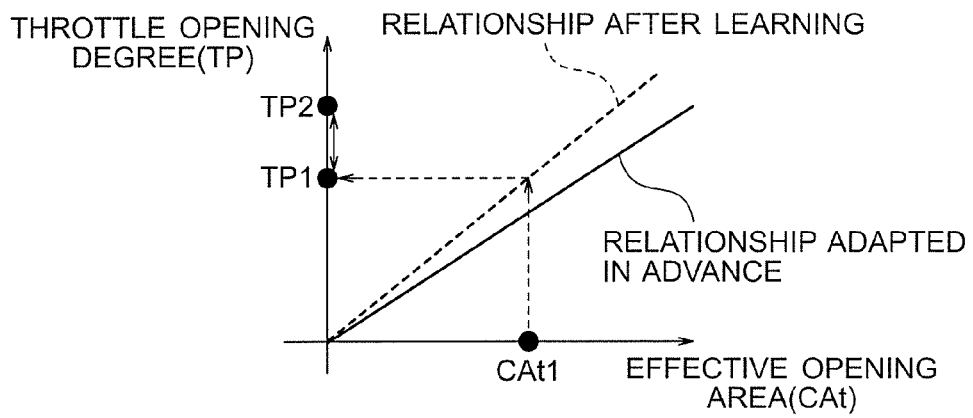
FIG. 11 is a graph showing a relationship between an effective opening area and a throttle opening degree according to the embodiment of the present invention.

Then, in Step S903, the actual effective opening area CAt of the throttle valve is calculated by using Expression (34). Then, in Step S904, the throttle opening degree learning value is calculated. A description is later given of a method of calculating the throttle opening degree learning value. Then, in Step S905, the dispersion of the throttle opening degree error is calculated. The dispersion of the throttle opening degree error is calculated by following a flowchart illustrated in FIG. 10. A description is now given of the flowchart of FIG. 10. First, in Step S1001, the current throttle opening degree learning value is calculated from the actual effective opening area CAt calculated in Step S903, the relationship map between the effective opening area and the throttle opening degree adapted in advance, and the throttle opening degree learning value at the previous processing timing, thereby calculating the throttle opening degree after learning is performed with respect to the actual effective opening area CAt. For example, as shown in FIG. 11, if the throttle opening degree is assigned to the vertical axis and the effective opening area is assigned to the horizontal axis, when the relationship map between the effective opening area and the throttle opening degree adapted in advance is represented by the solid line, the relationship map between the effective opening area and the throttle opening degree corrected by the throttle opening degree learning value is represented by the broken line. On this occasion, as shown in FIG. 11, when the actual effective opening area calculated in Step S903 is represented as CAt1, the throttle opening degree after learning TP1 is acquired.

Then, in Step S1002, the throttle opening degree error is calculated from an actual throttle opening degree TP2 detected by the throttle opening degree sensor 14 and the throttle opening degree after learning TP1. In Step S1003, a variance of the throttle opening degree error is calculated as the dispersion of the throttle opening degree error on the assumption that the dispersion thereof is a normal distribution. The variance is defined as Expression (35) for a sample constructed by N pieces of data (x1, x2, . . . , xn).

$$s^2 = \frac{1}{N}\sum_{i=1}^{N}(x_i - \bar{x})^2 \quad \left(\because \bar{x} = \frac{1}{N}\sum_{i=1}^{N} x_i\right) \tag{35}$$

The variance is the mean square of an error between each piece of data and an average of the data. According to this embodiment, in order to simply calculate the variance, the throttle opening degree after learning TP1 is used as the average to calculate the square of an error between the throttle opening degree after learning TP1 and the actual throttle opening degree TP2, and, further, a value acquired by averaging the squares by means of a first-order filter is considered as a value corresponding to the variance. Specifically, the variance is calculated by using Expressions (36) and (37).

$$TP_s[n] = (TP_2[n] - TP_1[n])^2 \tag{36}$$

$$TP_g[n] = K_g \times TP_g[n-1] + (1 - K_g) \times TP_s[n] \tag{37}$$

In Expressions (36) and (37), TPs is the square of the throttle opening degree error, TPg is the variance of the throttle opening degree error, and Kg is a filter coefficient for which a value adapted in advance is used. In addition to the above-mentioned value acquired by the first-order filtering, for example, a moving average may be used. In this case, n represents a current value, and n−1 represents a previous value.

As described above, when the dispersion of the throttle opening degree error is assumed to be the normal distribution, the variance can be used as the dispersion of the throttle opening degree error, and the extent of the dispersion can be easily estimated. This is the end of the dispersion calculation for the throttle opening degree error. Note that, the variance is used herein, but the standard deviation that is the square root of the variance may be used.

A description now returns to the flowchart of FIG. 9. In Step S906, whether or not a pressure ratio is smaller than a threshold A set in advance is determined. On this occasion, the pressure ratio is the ratio of the pressure before the throttle to the pressure after the throttle, and is specifically represented as the intake manifold pressure Pb/estimated P2. The threshold A is set to a value close to 1, for example, 0.95. This is because, when the pressure ratio is larger than 0.95 and close to 1, a sensitivity of the non-dimensional flow rate σ may be high to increase the error in the throttle opening degree learning value, which needs to be avoided. When the determination in Step S906 is Yes, the processing proceeds to Step S907, and when the determination is No, the processing proceeds to Step S912. In Step S912, the estimated P2 is directly set to the corrected P2 and the processing is finished.

In Step S907, whether or not the variance, which is the dispersion of the throttle opening degree error calculated in Step S905, is larger than a threshold B. When the determination is Yes, the processing proceeds to Step S908, and when the determination is No, the processing proceeds to Step S912 and the processing is finished.

Figure 12:
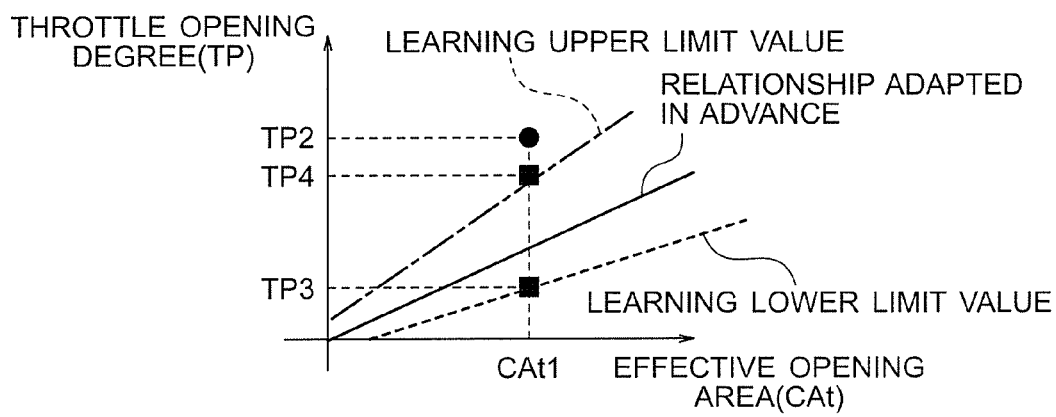
FIG. 12 is a graph showing a learning range of the relationship between the effective opening area and the throttle opening degree according to the embodiment of the present invention.

Then, in Step S908, whether or not the actual throttle opening degree T2 corresponding to the actual effective opening area CAt1 is smaller than a throttle opening degree learning lower limit value. When the determination is Yes, the processing proceeds to Step S909, and when the determination is No, the processing proceeds to Step S910. As shown in FIG. 12, if the throttle opening degree is assigned to the vertical axis and the effective opening area is assigned to the horizontal axis, when the relationship map between the effective opening area and the throttle opening degree adapted in advance is represented by the solid line, the throttle opening degree learning lower limit value is represented by the broken line, and a throttle opening degree learning upper limit value is represented by the dashed-dotted line. The learning upper/lower limit values are set in advance in consideration of the throttle machine difference dispersion. When an intersection between the actual effective opening area CAt1 calculated in Step S903 and the actual throttle opening degree TP2 acquired from the throttle opening degree sensor 14 is lower than a throttle opening degree learning lower limit value TP3, the determination is Yes. In the example shown in FIG. 12, the intersection is above the throttle opening degree learning lower limit value TP3, and the determination is thus No.

In Step S909, a value acquired by adding a constant value Ptg_up set in advance to the estimated P2 is set as the corrected P2, and the processing is finished. When the intersection is below the throttle opening degree learning lower limit value, it is considered that this deviation is caused not because of the throttle machine difference dispersion, but because the actual throttle upstream pressure P2 is larger than the estimated P2. The sum of the constant value set in advance and the estimated P2 is thus set as the corrected P2. The constant value Ptg_up is desirably a value, for example, equal to or less than 1 [kPa] in order to avoid a rapid change in the estimated value.

In Step S910, whether or not the actual throttle opening degree TP2 is larger than a throttle opening degree learning upper limit value TP4 is determined. In the example shown in FIG. 12, the intersection is above the throttle opening degree learning upper limit value TP4, and the determination is thus Yes. When the determination is Yes, the processing proceeds to Step S911 where a value acquired by subtracting a constant value Ptg_down set in advance from the estimated P2 is set as the corrected P2, and the processing is finished. The learning upper limit value TP4 is set in advance in consideration of the throttle machine difference dispersion. When the throttle opening degree learning value is larger than the learning upper limit value TP4, it is considered that this deviation is caused not because of the throttle machine difference dispersion, but because the actual throttle upstream pressure P2 is smaller than the estimated P2. A value acquired by subtracting the constant amount from the estimated P2 is thus set as the corrected P2. The constant value Ptg_down is desirably a value, for example, equal to or less than 1 [kPa] in order to avoid a rapid change in the estimated value. When the determination is No, the estimated P2 is determined to be correct, and the processing proceeds to Step S912 and is finished.

Through the processing described above, the statistical dispersion of the deviation between the throttle opening degree and the actual throttle opening degree in consideration of the throttle opening degree learning value can be set as the determination criteria, thereby precisely correcting the estimated P2.

Figure 13:
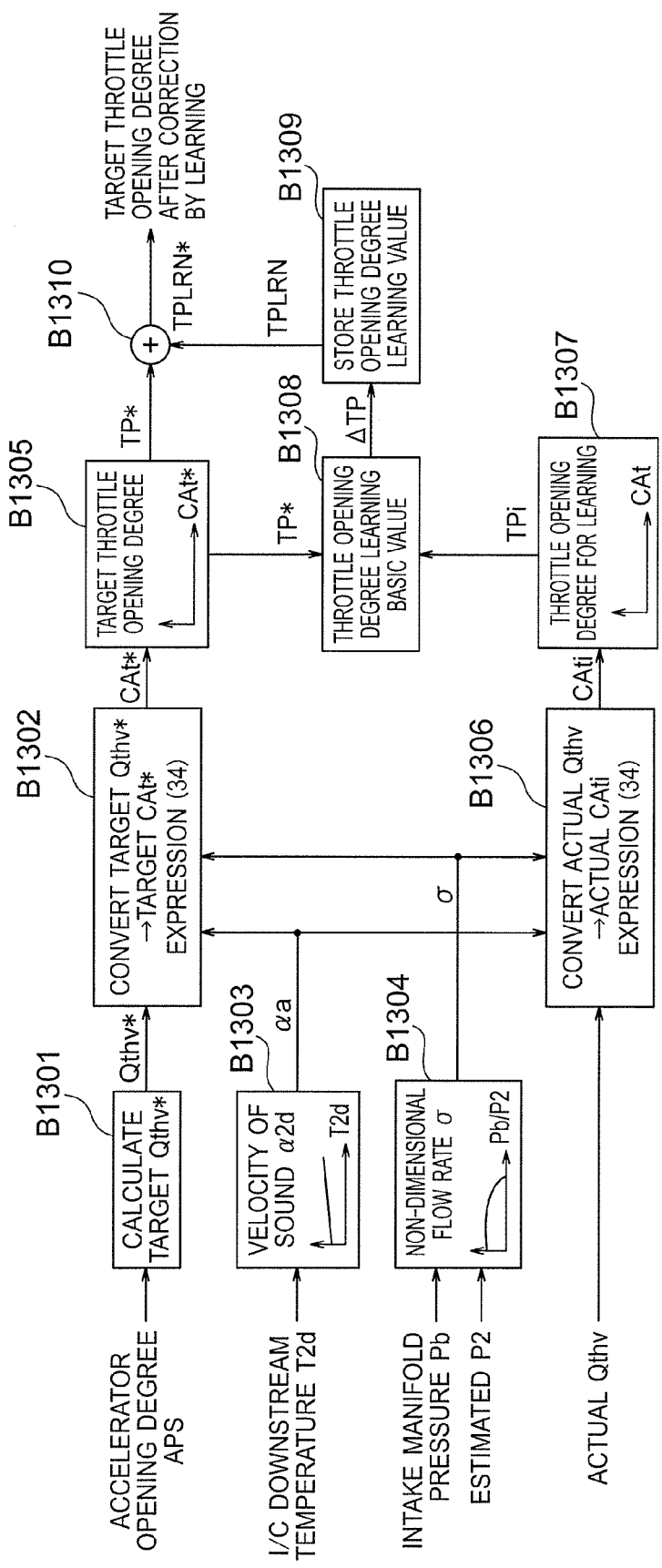
FIG. 13 is a control block diagram for calculating a throttle opening degree learning value according to the embodiment of the present invention.
Figure 14:
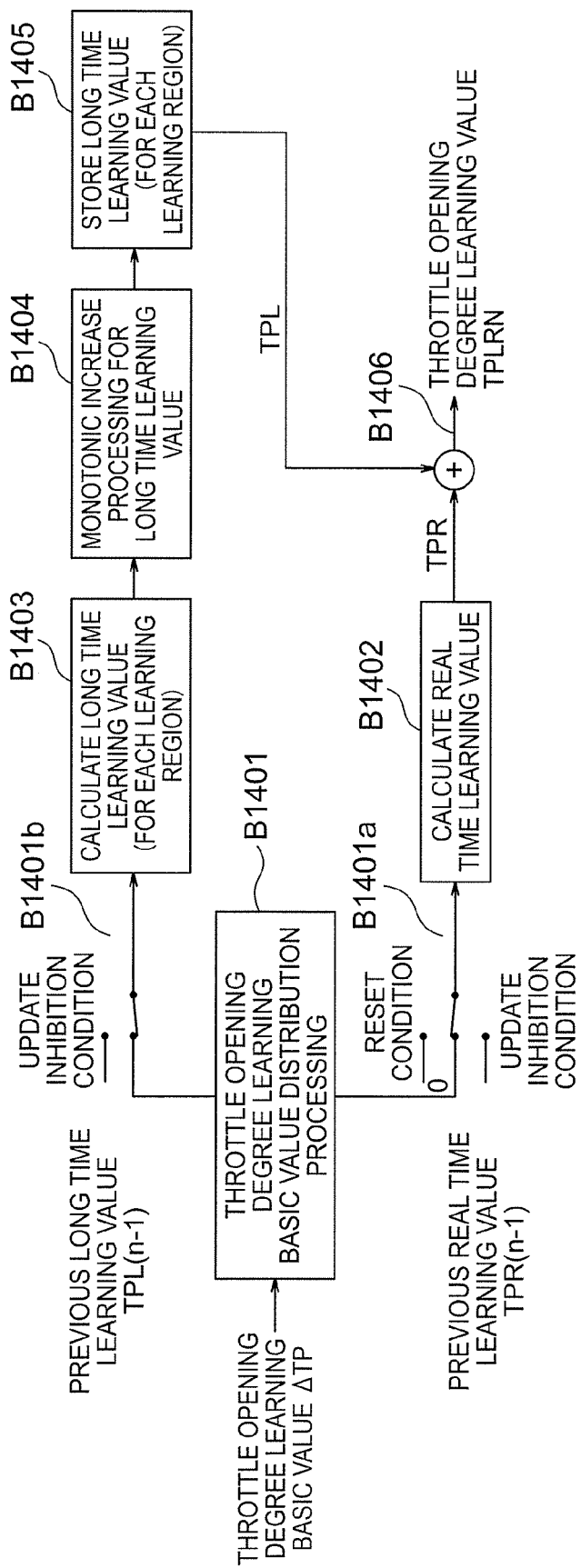
FIG. 14 is a control block diagram for storing a long time learning value according to the embodiment of the present invention.

A detailed description is now given of calculation of the throttle opening degree learning value in Step S904. Basically, the calculation is the same as that in the method disclosed in Prior Application 2. A description is now given of a method of realizing the processing of calculating the throttle opening degree learning value and processing of storing a long time learning value by using the theoretical equations represented as Expressions (30) to (34). FIGS. 13 and 14 are control block diagrams illustrating the processing of calculating the throttle opening degree learning value and the processing of storing the long time learning value. First, referring to the control block diagram illustrated in FIG. 13, a description is given of an overview of the throttle control and the throttle opening degree learning. In Block B1301, an engine output index such as a target torque is calculated from input various types of data such as the accelerator opening degree A target cylinder intake air amount required to achieve the calculated engine output index is calculated. Also, a target intake air amount (hereinafter referred to as "target Qthv*") passing through the throttle is calculated based on the target cylinder intake air amount. Then, in Block B1302, a target effective opening area (hereinafter referred to as "target CAt*") is calculated by using Expression (34) from the target Qthv*, the speed of sound $\alpha 2d$ upstream of the throttle, and the non-dimensional flow rate $\sigma$. Because the target CAt* is calculated based on the flow rate calculation equation for the orifice flow meter in this way, the target CAt* for achieving the target Qthv* can be appropriately calculated even in a case where the operation state of the engine is changed due to a change in environmental conditions and an introduction of the EGR.

Incidentally, when the speed of sound $\alpha 2d$ required for the calculation in Block B1302 is calculated in the ECU 100 by using Expression (33), a calculation load is increased. Thus, a theoretical value of the speed of sound upstream of the throttle is calculated in advance and is stored as a map having the throttle upstream temperature T2d as an axis as in Block B1303. Then, in Block B1303, the speed of sound $\alpha 2d$ is calculated by reference to the map by using the throttle upstream temperature T2d before the calculation in Block B1302.

Further, when the non-dimensional flow rate $\sigma$ required for the calculation in Block B1302 is calculated by using Expression (31) in the ECU 100, a calculation load becomes enormous, which is thus not practical. Therefore, as in Block B1304, in order to suppress the calculation load in the ECU 100, a theoretical value of the non-dimensional flow rate is calculated in advance and is stored as a map having the pressure ratio Pb/P2 of the intake manifold pressure Pb to the estimated P2 as an axis. The pressure ratio Pb/P2 of the intake manifold pressure Pb to the estimated P2 is calculated before the calculation in Block B1302, and, in Block B1304, the non-dimensional flow rate $\sigma$ is calculated by using the calculated pressure ratio Pb/P2.

By the way, it is known in general that, when the pressure ratio Pb/P2 is equal to or less than a threshold E (approximately 0.528 for the air), the flow rate of the air passing through the throttle saturates (so called choke). It is also know that the non-dimensional flow rate 6 calculated by using Expression (31) becomes constant when the choke occurs. Thus, when the pressure ratio of the intake manifold pressure to the atmospheric pressure is equal to or less than the threshold E, the case where the choke occurs can be handled by setting the value of the map in Block B1304 to a constant value (approximately 0.5787 for the air) corresponding to the threshold E.

Moreover, when the pressure ratio Pb/P2 increases to a certain value, there is a case where an influence of a vibration of the intake manifold pressure caused by an intake air pulsation on the non-dimensional flow rate $\sigma$ increases. Thus, when the pressure ratio Pb/P2 is equal to or more than a threshold Pr (such as approximately 0.95) set in advance, the value of the map in Block B1304 can be treated as a constant value (such as approximately 0.26) corresponding to the threshold Pr, thereby decreasing the influence of the intake air pulsation to secure throttle controllability. When a peak value of the intake manifold pressure is larger than the throttle upstream pressure, it is considered that air flows backward through the throttle by a pressure oscillation in the intake manifold. Thus, also in this case, the value of the map in Block B1304 may be treated as a constant value (such as approximately 0.26) corresponding to the threshold Pr.

As described above, the target CAt* calculated in Block B1302 is used to calculate the target throttle opening degree TP* in Block B1305. On this occasion, the relationship between the actual effective opening area CAt calculated from the throttle intake air flow rate Qthv by using Expression (34) and the throttle opening degree TP is measured in advance, and is stored as a relationship map between the effective opening area and the throttle opening degree where the actual effective opening area CAt and the throttle opening degree TP corresponding to each other on a one-on-one basis. This map can be used to calculate the target throttle opening degree TP* from the target effective opening area CAt*.

A description is now given of a method of calculating a throttle opening degree learning value TPLRN so as to degrease the error between the target Qthv and the actual Qthv caused by dispersions of the throttle body and the various sensors and various estimation errors when the throttle is controlled by using the target throttle opening degree TP* calculated as describe above.

In Block B1306, in order to calculate the throttle opening degree learning value TPLRN, the actual effective opening area CAti used for learning is calculated from the actual throttle intake air flow rate Qthv, the speed of sound $\alpha 2d$ upstream of the throttle, and the non-dimensional flow rate $\sigma$. Then, in Block B1307, a throttle opening degree for learning is calculated from the actual effective opening area CAti by using the same map as in Block B1305. Then, in Block B1308, a deviation $\Delta TP$ (=TP*−TPi) between the target throttle opening degree TP* and the throttle opening degree for learning TPi is calculated as a throttle opening degree learning basic value. In Block B1309, the throttle opening degree learning value TPLRN is calculated by, for example, integrating $\Delta TP$, and is stored. A detailed description is given later of the storage processing for the throttle opening degree learning value TPLRN in Block B1309. In Block B1310, the target throttle opening degree Tp* and the throttle opening degree learning value TPLRN calculated as described above are added to each other, thereby calculating a target throttle opening degree after correction by learning TPLRN* for finally driving the throttle valve 4.

In this way, in the calculation processing for the throttle opening degree learning value, the throttle opening degree learning value TPLRN is calculated based on the throttle opening degree learning basic value ΔTP (deviation between the target opening degree TP* and the opening degree for learning TPi), and the target throttle opening degree TP* is corrected by using the throttle opening degree learning value TPLRN, thereby calculating the target throttle opening degree after correction by learning TPLRN*.

Figure 15:
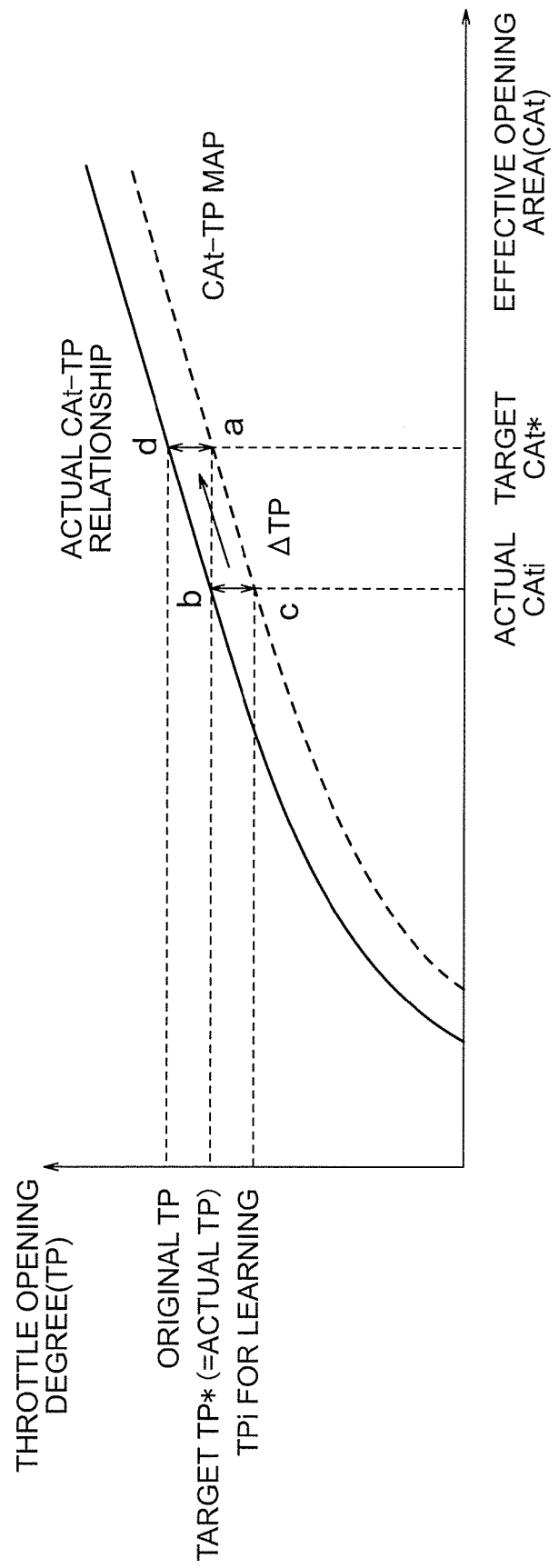
FIG. 15 is a graph showing a method of calculating a throttle opening degree learning basic value according to the embodiment of the present invention.

Also referring to FIG. 15, a specific description is now given of a learning function of the throttle opening degree control. FIG. 15 is a chart illustrating the method of calculating the throttle opening degree learning basic value. On this occasion, when the throttle opening degree TP and the actual effective opening area CAt are considered to correspond to each other on a one-on-one basis, and an error occurs between the target throttle intake air amount Qthv* and the actual throttle intake air amount Qthv, an error also occurs between the target effective opening area CAt* calculated from the target throttle intake air amount Qthv* and the actual effective opening area CAti calculated from the actual throttle intake air amount Qthv.

For example, as shown in FIG. 15, a case is considered where an error occurs between the relationship map (hereinafter referred to as "CAt-TP map") (used in Blocks B1305 and B1307, refer to the broken line) between the effective opening area and the throttle opening degree used for the control and the relationship (hereinafter referred to as "actual CAt-TP relationship", refer to the solid line) between the actual effective opening area CAt and the actual throttle opening degree TP calculated by estimation in consideration of the dispersion of the throttle body of the engine 1 which is the current subject of the control and the dispersions of the various sensors for measuring the intake manifold pressure Pb, the intake air temperature Ta, and the like.

On this occasion, the relationship between the target effective opening area CAt* and the target throttle opening degree TP* is represented as a point "a" on the CAt-TP map of FIG. 15. When an error occurs between the CAt-TP map (broken line) and the actual CAt_TP relationship (solid line) as shown in FIG. 15, the actual effective opening area CAti of a point "b" on the actual CAt-TP relationship (solid line) corresponding to the target throttle opening degree TP* is different from the target effective opening area CAt*. In this case, the actual throttle intake air amount Qthv acquired when the throttle opening degree TP is controlled to match the target throttle opening degree TP* does not thus match the target throttle intake air amount Qthv*.

Then, in order to calculate the learning value for correcting this error, the actual effective opening area CAti is calculated based on the actual throttle intake air amount Qthv measured when the throttle opening degree TP is controlled to match the target throttle opening degree TP*. The relationship between the actual effective opening area CAti and the target opening degree TP* is represented by the point "b" on the curve of the actual CAt-TP relationship (solid line) of FIG. 15.

In FIG. 15, in order to achieve the target effective opening area CAt* (target throttle intake air amount Qthv*), the throttle opening degree TP needs to be controlled to match a point "d" on the curve of the actual CAt-TP relationship (solid line). Thus, a difference between the point "a" and the point "d" needs to be calculated as a learning value. On this occasion, as shown in FIG. 15, when it is assumed that the CAt-TP map (broken line) and the actual CAt-TP relationship (solid line) are locally approximately in parallel with each other, a throttle opening degree for learning TPi is calculated by using the CAt-TP map (broken line) based on the actual effective opening area CAti calculated from the actual throttle intake air amount Qthv when the throttle opening degree TP is controlled to match the target throttle opening degree TP*.

The relationship between the thus calculated throttle opening degree for learning TPi and the actual effective opening area CAti is represented as a point "c" on the CAt-TP map (broken line) of FIG. 15. Thus, the throttle opening degree learning basic value ΔTP (=TP*−TPi) represented as a difference between the point "b" and the point "c" can be considered to be approximately equal to the learning basic value between the point "a" and the point "d". A value acquired by multiplying this throttle opening degree learning basic value ΔTP by a gain, and then integrating the product is the throttle opening degree learning value TPLRN. The error between the target throttle intake air amount Qthv* and the actual throttle intake air amount Qthv is decreased by controlling the throttle opening degree based on the target throttle opening degree after correction by learning TPLRN* calculated by adding the throttle opening degree learning value TPLRN to the target throttle opening degree TP*.

As a result, when the throttle opening degree TP is calculated to acquire the target throttle intake air amount Qthv*, the relationship between the actual effective opening area CAt and the throttle opening degree TP can be corrected by learning so that the target throttle intake air amount Qthv* is appropriately achieved with respect to the dispersions of the throttle body and the various sensors and the errors in the various estimation calculations. On this occasion, when the error between the CAt-TP map (broken line) and the actual CAt-TP relationship (solid line) is approximately constant (practically parallel with each other), appropriate control can be carried out over an entire operation region even if the throttle opening degree learning value TPLRN is solely used for the feedback control.

Figure 16:
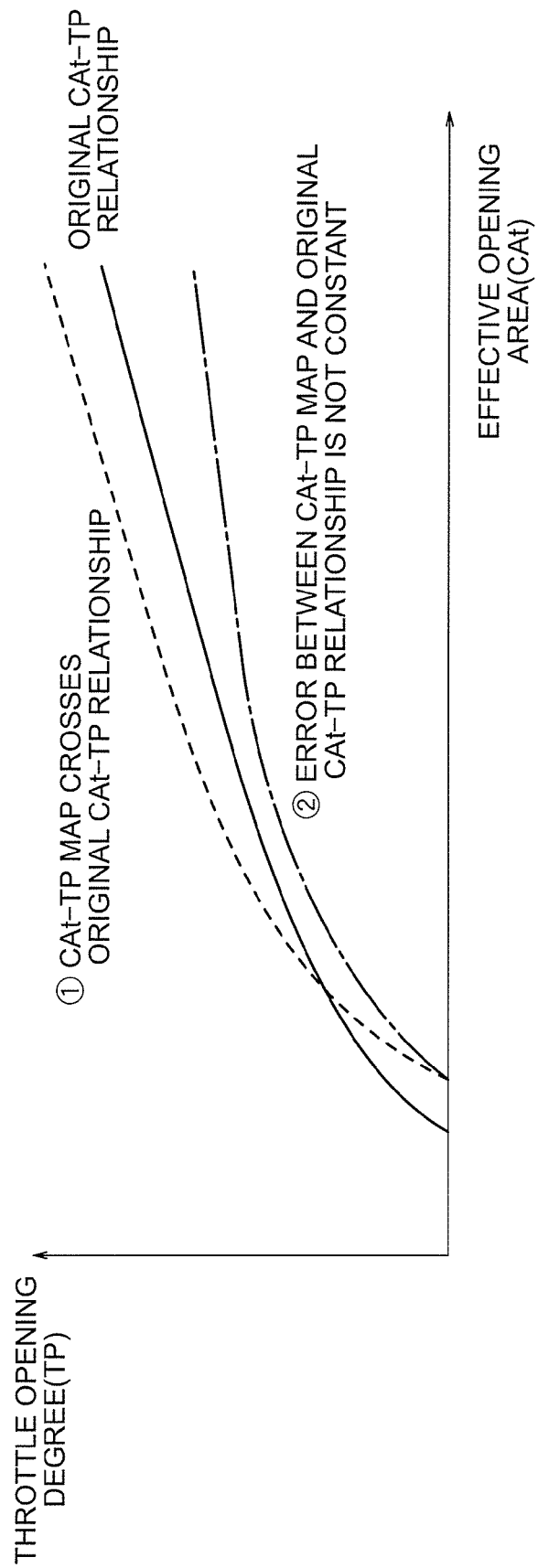
FIG. 16 is a graph showing possible relationships between the effective opening area and the throttle opening degree according to the embodiment of the present invention.

Incidentally, for example, as shown in FIG. 16, (1) when the CAt-TP map crosses the actual CAt-TP relationship (refer to the solid line), or (2) when the error of the CAt-TP map is not constant (parallel) with respect to the actual CAt-TP relationship (refer to the dashed-dotted line), such a problem as a lag in following and an overshoot may occur in a transient operation if the throttle opening degree learning value TPLRN is solely used.

Thus, in order to handle this case, as illustrated in FIG. 14, it is desired that the throttle opening degree learning basic value ΔTP be stored after being distributed to a real time learning value TPR used for feedback control and a long time learning value TPL stored for respective learning regions corresponding to the CAt axis (horizontal axis of FIGS. 15 and 16) of the CAt-TP map, and the throttle opening degree learning value TPLRN is calculated based on the real time learning value TPR and the long time learning value TPL. As a result, a sum of the value on the CAt-TP map and the long time learning value TPL can be made close to the actual CAt-TP relationship. Moreover, when the real time learning value TPR is simultaneously used, a momentary error can be absorbed by the feedback control. Referring to explanatory diagrams of FIGS. 17 and 18 along with the functional block diagram of FIG. 14, a detailed description is now given of the method of calculating and storing the throttle opening degree learning value.

In FIG. 14, in Block B1401, the distribution processing for the throttle opening degree learning basic value ΔTP is carried out, and the throttle opening degree learning basic value ΔTP is distributed to the real time learning value TPR and the long time learning value TPL at a certain ratio set in advance. Switching means 1401a inputs "0" to Block B1402 for calculating the real time learning value, when a reset condition set in advance is satisfied. Switching means 1401a inputs a previous real time learning value TPR(n−1) when an update inhibition condition set in advance is satisfied. Also, Switching means 1401a inputs, when neither the reset condition nor the update inhibition condition for the real time learning value TPR is satisfied, the throttle opening degree learning basic value ΔTP after the distribution. Thus, in Block B1402, when neither the reset condition nor the update inhibition condition (described later) for the real time learning value TPR is satisfied, a final real time learning value TPR is calculated based on the throttle opening degree learning basic value ΔTP after the distribution.

Switching means 1401b inputs, when the update inhibition condition set in advance is satisfied, a previous longtime learning value TPL(n−1) to Block B1403, and inputs, when the update inhibition condition for the long time learning value TPL is not satisfied, the throttle opening degree learning basic value ΔTP after the distribution. Thus, in Block B1403, when the update inhibition condition for the long time learning value TPL is not satisfied, based on the throttle opening degree learning basic value ΔTP after the distribution, the final long time learning value TPL is calculated for the each learning region corresponding to the CAt axis of the CAt-TP map.

Note that, specific examples of the update inhibition conditions for the switching means 1401a and 1401b include a case where the pressure ratio Pb/P2 of the intake manifold pressure Pb to the estimated P2 presents a value equal to or more than a threshold F set in advance and a case where the intake manifold pressure peak value is larger than the throttle upstream pressure. Because an error occurs in the calculation of Expression (34) in such cases, the updates of the real time learning value TPR and the long time learning value TPL can be inhibited.

Moreover, as a specific example of the reset condition for the switching means 1401a, in a period during which an elapsed time after a time change rate dQthv*/dt of the target throttle intake air amount Qthv* reaches a value equal to or more than a threshold G set in advance is less than a threshold H set in advance, the real time learning value TPR may be reset. This condition, which corresponds to a detection of a transient operation, can also be used as the update inhibition condition for the long time learning value TPL to suppress incorrect learning.

In Block B1404, the long time learning value TPL is limited so that the CAt-TP map and the actual CAt-TP relationship after the correction by the addition of the long time learning value TPL present a monotonic increase. This is also processing for suppressing incorrect learning, and is processing for maintaining the relationship between the throttle opening degree and the intake air amount to be the monotonic increase. In Block B1405, the long time learning value TPL after the monotonic increase processing is stored for each learning region. In Block B1406, the real time learning value TPR and the long time learning value TPL are added to each other to calculate the throttle opening degree learning value TPLRN.

Note that, in Block B1405, the long time learning value is stored in a backup memory. In other words, when the engine 1 is stopped or a power supply to the ECU 100 is turned off, the real time learning value TPR is reset, but the long time learning value TPL is held in the backup memory.

Figure 17:
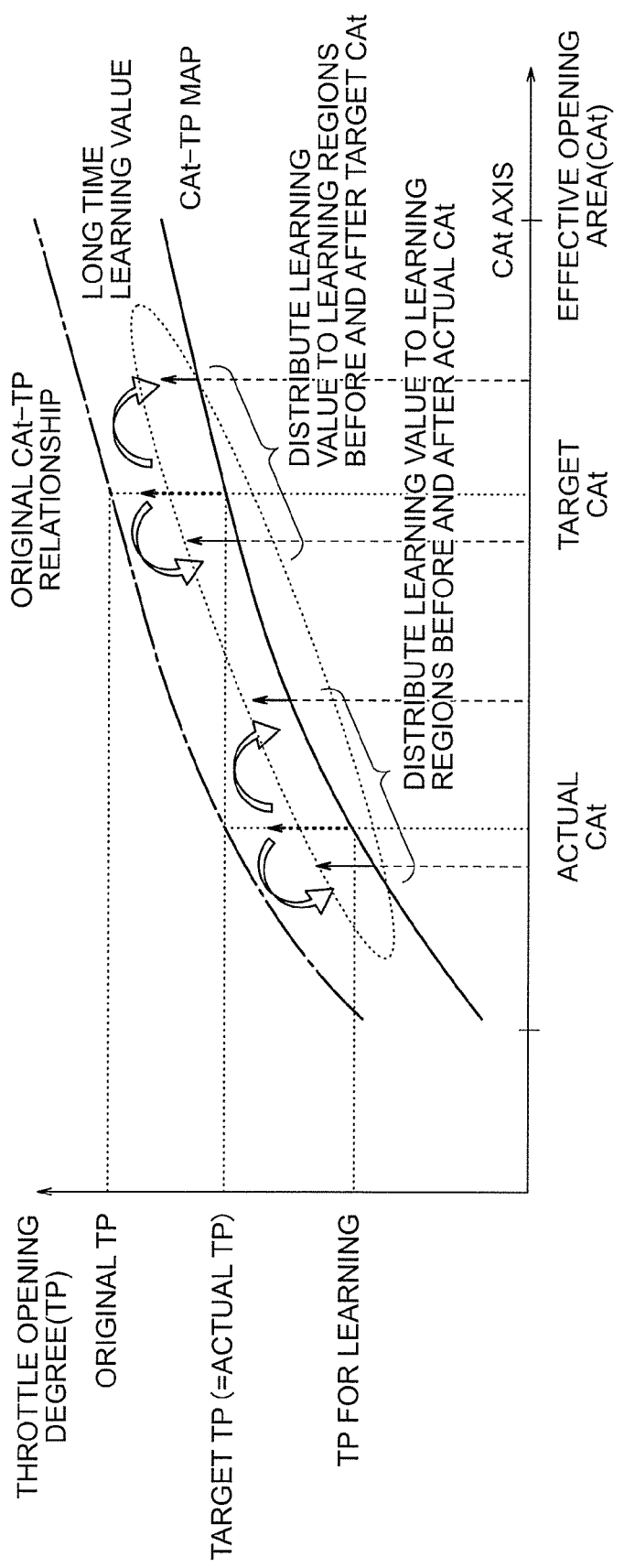
FIG. 17 is a graph showing processing of storing the long time learning value according to the embodiment of the present invention.
Figure 18:
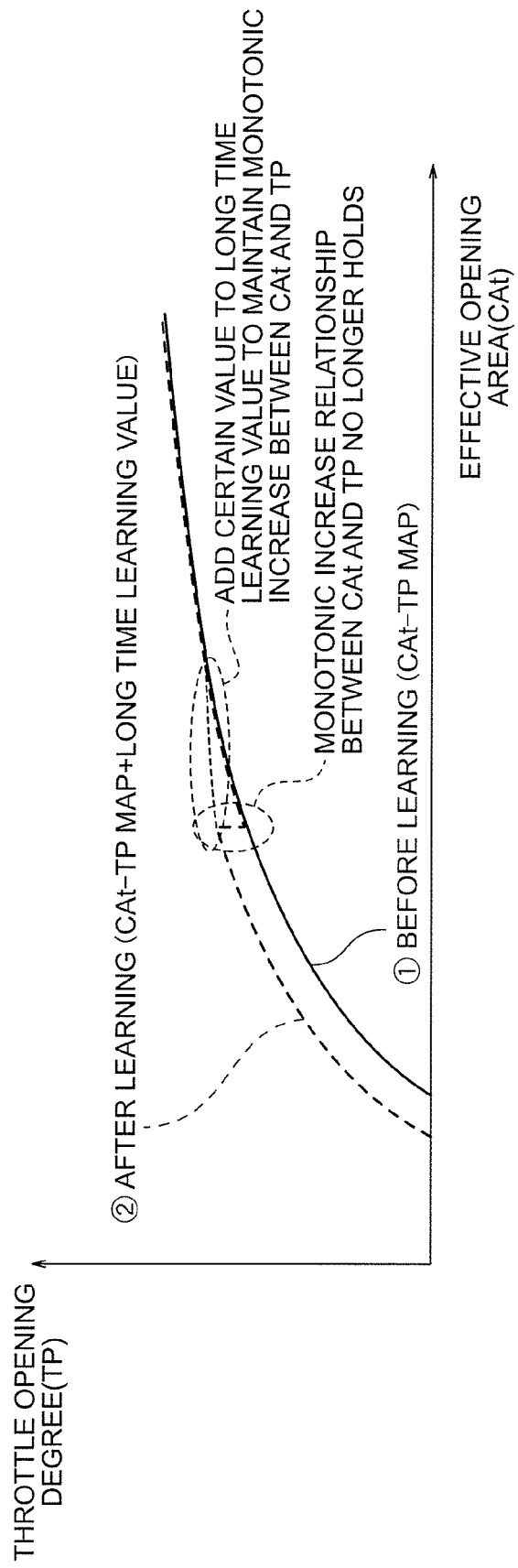
FIG. 18 is a graph showing monotonic increase processing according to the embodiment of the present invention.

Referring to FIGS. 17 and 18, a specific description is now given of the processing of calculating the long time learning value TPL for each learning region illustrated in FIG. 14. FIGS. 17 and 18 are graphs showing the storage processing and the monotonic increase processing for the long time learning value. In FIG. 15, the throttle opening degree learning basic value ΔTP is the difference between the point "b" and the point "c", but is also applied as the learning value between the point "a" and the point "d". Now, a case is considered where the throttle opening degree learning basic value ΔTP is distributed and stored for each learning region corresponding to the CAt axis of the CAt-TP map on a one-on-one basis. On this occasion, as shown in FIG. 15, the distributed throttle opening degree learning basic value ΔTP can be stored as the long time learning value TPL in at least one of a learning region corresponding to the CAt axis before and after the target effective opening area CAt* or a learning region corresponding to the CAt axis before and after the actual effective opening area CAti.

Note that, the long time learning value TPL stored in each learning region corresponding to the CAt axis can be calculated by adding a certain value set in advance based on the throttle opening degree learning basic value ΔTP to the previous long time learning value TPL(n−1), or by calculating a value corresponding to a ratio of a distance from the certain value to the CAt axis before and after the target effective opening area CAt* to a distance from the certain value to the CAt axis before and after the actual effective opening area CAti and adding the calculated value to the previous long time learning value TPL(n−1). Moreover, when the long time learning values TPL are stored for both the target effective opening area CAt* and the actual effective opening area CAti, a convergence period of the long time learning value TPL can be decreased.

When the long time learning value TPL is calculated in this way, the condition for permitting the learning is only the case where the update inhibition condition is not satisfied, and the learning is thus actually carried out only in a normally used region of the steady state operation. Moreover, in general, the throttle opening degree TP and the intake air amount Qthv are in the monotonically increasing relationship, and the relationship between the effective opening area CAt and the throttle opening degree TP thus also needs to be a monotonically increasing relationship.

However, when the local learning is carried out, as indicated by the broken line and the broken line frame of FIG. 18, the sum (refer to the broken line) of the value of the CAt-TP map (refer to the solid line) and the long time learning value TPL may not monotonically increase. In this case, for example, although the target throttle intake air amount Qthv* increases, the target opening degree after correction by learning TPLRN* decreases, resulting in problems of a decrease in the output of the engine 1 and incorrect learning of the throttle opening degree learning value TPLRN.

Thus, in Block B1404, as indicated by the dotted line and the dotted line frame of FIG. 18, processing of limiting the long time learning value TPL for each learning region for the long time learning value TPL is carried out so that the sum (referred to the dotted line) of the value of the CAt-TP map (referred to the solid line) and the longtime learning value TPL monotonically increases. As a result, the incorrect learning of the throttle opening degree learning value TPLRN and an erroneous operation can be prevented. As a result of the configuration described above, the throttle opening degree can be corrected by learning, and the relationship between the throttle opening degree and the effective opening area can be learned.

In this embodiment, it has been described that the throttle upstream pressure P2 can be estimated by applying the physical model of the intake system according to the present invention to the control system for an engine equipped with a turbocharger in this way. The estimated P2 can be used to precisely calculate the cylinder intake air amount Qc and the like even in a system without the throttle upstream pressure sensor. Moreover, the estimated P2 can also be used for a fault diagnosis of the throttle upstream pressure sensor in a system including the throttle upstream sensor. Further, P2 can be precisely estimated by correcting the throttle upstream pressure, and the cylinder intake air amount Qc and the like can be precisely calculated by using the corrected P2.

As described above, the control apparatus for an internal combustion engine according to this embodiment includes the throttle valve 4 provided in the intake system of the internal combustion engine, the throttle opening degree sensor 14 (throttle opening degree detection part) for detecting the opening degree of the throttle valve 4, the supercharger 36 including the compressor 31 provided in the intake system upstream of the throttle valve 4, the throttle upstream pressure control part (ECU 100) for controlling the drive state of the supercharger 36, thereby controlling the throttle upstream pressure P2, which is the pressure in the supercharged portion downstream of the compressor and upstream of throttle valve, the AFS 12 (intake air amount detection part) provided upstream of the compressor 31, for detecting the intake air amount Qa, the intake manifold pressure sensor 15 (intake manifold pressure detection part) for detecting the pressure in the intake manifold portion (intake manifold 5) downstream of the throttle valve as the intake manifold pressure Pb, the cylinder intake air amount calculation part (ECU 100) for calculating the cylinder intake air amount Qc taken from the intake manifold portion into the cylinder 8 based on the intake manifold pressure Pb, and the throttle upstream pressure estimation part (ECU 100) for calculating the average density $\rho ave(n)$ in the region combining the supercharged portion and the intake manifold portion with each other (regions "b", "c", and "d" of FIG. 3) based on the intake air amount Qa and the cylinder intake air amount Qc, and estimating the throttle upstream pressure P2 based on the intake manifold pressure Pb and the average density $\rho ave(n)$ to output the estimated throttle upstream pressure as the throttle upstream pressure estimated value (estimated P2). This embodiment is configured in this way, and the average density $\rho ave(n)$ in the region combining the supercharged portion and the intake manifold portion with each other (regions "b", "c", and "d" of FIG. 3) can be calculated based on the intake air amount Qa and the cylinder intake air amount Qc, thereby estimating the throttle upstream pressure P2 based on the intake manifold pressure Pb and the average density $\rho ave(n)$. The throttle upstream pressure estimated value (estimated P2) can be used to carry out the throttle control and the throttle upstream pressure control, for example. Moreover, in a case of a control system for an engine equipped with a supercharger including the throttle upstream pressure sensor, the throttle upstream pressure estimated value (estimated P2) can be used for, for example, a failure determination for the throttle upstream pressure sensor.

Moreover, the control apparatus for an internal combustion engine according to this embodiment further includes the intake manifold temperature sensor 16 (intake manifold temperature detection part) for detecting the temperature in the intake manifold portion as the intake manifold temperature Tb, and the I/C 30 (intercooler) provided in the supercharged portion, for decreasing the temperature in the supercharged portion. The throttle upstream pressure estimation part (ECU 100) includes the intercooler downstream temperature estimation part for estimating the temperature T2d in the supercharged portion downstream of the intercooler based on the intake manifold temperature Tb, and estimates the throttle upstream pressure P2 based on the intake manifold pressure Pb, the average density $\rho ave(n)$, and the intercooler downstream temperature T2d. Thus, the throttle upstream pressure can be estimated also in the control system for an engine equipped with a supercharger including an intercooler in the supercharged portion.

Moreover, in the control apparatus for an internal combustion engine according to this embodiment, the supercharger 36 is the turbocharger 36 constructed by the turbine 32 provided in the exhaust system of the internal combustion engine, and the compressor 31 configured to rotate integrally with the turbine 32, and the throttle upstream pressure control part (ECU 100) operates the waste gate valve 34 provided in the bypass passage for bypassing the turbine 32, thereby controlling the throttle upstream pressure P2. Thus, the throttle upstream pressure P2 can be estimated even in the control system for an engine equipped with a turbocharger including the waste gate valve 34, and, for example, feedback control can be carried out by using the throttle upstream pressure estimated value (estimated P2).

Moreover, in the control apparatus for an internal combustion engine according to this embodiment, the waste gate valve 34 is driven by the electric motor. Thus, the throttle upstream pressure P2 can be estimated even in the control system for an engine equipped with a turbocharger including an electric waste gate valve.

Moreover, the control apparatus for an internal combustion engine according to this embodiment further includes the accelerator opening degree detection sensor 40 (accelerator opening degree detection part) for detecting an accelerator operation amount by the driver, the throttle valve control part (ECU 100) for calculating, based on the accelerator operation amount, the target intake air amount (target Qthv*) to be passed through the throttle valve 4, and controlling the throttle valve 4 based on the target intake air amount (target Qthv*), the intake manifold pressure Pb, the throttle upstream pressure estimated value (estimated P2), and the intake air amount Qa, and the throttle opening degree sensor 14 (throttle opening degree detection part) for detecting the actual throttle opening degree TP of the throttle valve 4. The throttle valve control part includes the relationship map storage part for storing the relationship map between the throttle opening degree TP acquired by measuring and adapted in advance and the effective opening area CAt, the actual effective opening area calculation part for calculating the actual effective opening area CAt of the throttle valve 4 based on the intake manifold pressure Pb, the throttle upstream pressure estimated value (estimated P2), and the intake air amount Qa, the throttle opening degree learning part for learning and correcting the relationship map based on the detected actual throttle opening degree TP and the calculated actual effective opening area CAt, the target effective opening area calculation part for calculating the target effective opening area CAt* of the throttle valve 4 based on the target intake air amount (target Qthv*), the intake manifold pressure Pb, and the throttle upstream pressure estimated value (estimated P2), and the target throttle opening degree calculation part for calculating the target throttle opening degree TP* based on the relationship map corrected by learning and the target effective opening area CAt*. Thus, the throttle upstream pressure estimated value (estimated P2) can be used to learn the relationship map between the effective opening area CAt and the throttle opening degree TP, thereby precisely controlling the target intake air amount.

Moreover, in the control apparatus for an internal combustion engine according to this embodiment, the throttle upstream pressure estimation part includes the dispersion calculation part for calculating the error between the relationship between the actual throttle opening degree TP and the actual effective opening area CAt and the relationship map corrected by learning, and the dispersion of the error, the dispersion range determination part for determining whether or not the dispersion of the error falls within the first range (threshold B) set in advance, the relationship range determination part for determining whether or not the relationship between the actual throttle opening degree TP and the actual effective opening area CAt falls within the second range set in advance with reference to the relationship map (whether or not the actual throttle opening degree TP falls within the range from the lower limit to the upper limit for the learning value), and the throttle upstream pressure correction part for correcting the throttle upstream pressure estimated value (estimated P2) when the relationship between the actual throttle opening degree TP and the actual effective opening area CAt is out of the second range and when the dispersion of the error is out of the first range. Thus, the throttle upstream pressure estimated value (estimated P2) can be corrected based on the relationship between the actual throttle opening degree TP and the actual effective opening area CAt, thereby precisely calculating the throttle upstream pressure P2.

Moreover, in the control apparatus for an internal combustion engine according to this embodiment, the error calculated by the dispersion calculation part is the throttle opening degree error calculated as the deviation between the throttle opening degree TP that is corrected by learning with respect to the actual effective opening area CAt calculated based on the relationship map corrected by learning, and the actual throttle opening degree TP, and the dispersion of the error calculated by the dispersion calculation part is a variance or a standard deviation of the throttle opening degree error. Thus, the dispersion of the error can easily be calculated by using the variance or the standard deviation as the dispersion of the error.

Moreover, in the control apparatus for an internal combustion engine according to this embodiment, the throttle upstream pressure correction part is configured to update the throttle upstream pressure estimated value (estimated P2) to be decreased when the actual throttle opening degree TP corresponding to the actual effective opening area CAt is larger than the throttle opening degree learning upper limit value set in advance, and update the throttle upstream pressure estimated value (estimated P2) to be increased when the actual throttle opening degree TP corresponding to the actual effective opening area CAt is smaller than the throttle opening degree learning lower limit value set in advance. Thus, the throttle upstream pressure estimated value (estimated P2) can be corrected based on the relationship between the actual throttle opening degree TP and the actual effective opening area CAt, thereby precisely calculating the throttle upstream pressure estimated value (estimated P2).

What is claimed is:

1. A supercharged internal combustion engine, comprising:
   a throttle valve disposed in an intake pipe of the internal combustion engine;
   a supercharger including a compressor disposed in the intake pipe upstream of the throttle valve;
   an airflow sensor (AFS) disposed upstream of the compressor and detecting an intake air amount;
   an intake manifold pressure sensor detecting a pressure in an intake manifold portion downstream of the throttle valve as an intake manifold pressure;
   a processor configured to execute a program; and
   a memory that stores the program which, when executed by the processor, performs:
   calculating a cylinder intake air amount taken from the intake manifold portion into a cylinder based on the intake manifold pressure;
   calculating an average density in a region combining a supercharged portion downstream of the compressor and upstream of the throttle valve and the intake manifold portion based on the intake air amount and the cylinder intake air amount;
   estimating a throttle upstream pressure, which is a pressure in a supercharged portion, based on the intake manifold pressure and the average density to output the estimated throttle upstream pressure as a throttle upstream pressure estimated value; and
   controlling the throttle upstream pressure based on the throttle upstream pressure estimated value, by controlling a drive state of the supercharger.

2. The supercharged internal combustion engine according to claim 1, further comprising:
   an intake manifold temperature sensor detecting a temperature in the intake manifold portion as an intake manifold temperature; and
   an intercooler disposed in the supercharged portion and decreasing a temperature in the supercharged portion,
   wherein the estimating the throttle upstream pressure comprises:
   estimating a temperature in the supercharged portion downstream of the intercooler based on the intake manifold temperature as an intercooler downstream temperature; and
   estimating the throttle upstream pressure based on the intake manifold pressure, the average density, and the intercooler downstream temperature.

3. The supercharged internal combustion engine according to claim 1, wherein:
   the supercharger comprises a turbocharger including a turbine arranged in an exhaust pipe of the internal combustion engine, and the compressor rotating integrally with the turbine; and
   the controlling the throttle upstream pressure comprises:
   operating a waste gate valve disposed in a bypass passage bypassing the turbine so as to control the throttle upstream pressure.

4. The supercharged internal combustion engine according to claim 3, wherein the waste gate valve is driven by an electric motor.

5. The supercharged internal combustion engine according to claim 1, further comprising:
   an accelerator opening degree sensor detecting an accelerator operation amount by a driver; and
   a throttle opening degree sensor detecting an actual throttle opening degree of the throttle valve, wherein the program results in performance of a further step comprising controlling the throttle valve,
wherein the controlling the throttle valve comprises:
- calculating, based on the accelerator operation amount, a target intake air amount to be passed through the throttle valve;
- storing a relationship map between a throttle opening degree acquired by measuring and adapted in advance and an effective opening area;
- calculating an actual effective opening area of the throttle valve based on the intake manifold pressure, the throttle upstream pressure estimated value, and the intake air amount;
- learning and correcting the relationship map based on the detected actual throttle opening degree and the calculated actual effective opening area;
- calculating a target effective opening area of the throttle valve based on the target intake air amount, the intake manifold pressure, and the throttle upstream pressure estimated value; and
- calculating a target throttle opening degree based on the target effective opening area by using the learned and corrected relationship map.

6. The supercharged internal combustion engine according to claim 5, wherein the estimating the throttle upstream pressure comprises:
- calculating an error between a relationship between the actual throttle opening degree and the actual effective opening area and the learned and corrected relationship map, and a dispersion of the error;
- determining whether or not the dispersion of the error falls within a first range set in advance;
- determining whether or not the actual throttle opening degree with respect to the actual effective opening area falls within a second range set in advance; and
- correcting the throttle upstream pressure estimated value when the actual throttle opening degree with respect to the actual effective opening area is out of the second range and when the dispersion of the error is out of the first range.

7. The supercharged internal combustion engine according to claim 6, wherein:
the error comprises a throttle opening degree error calculated as a deviation between the actual throttle opening degree and a learned and corrected throttle opening degree with respect to the actual effective opening area which is calculated based on the learned and corrected relationship map; and
the dispersion of the error comprises at least one of a variance or a standard deviation of the throttle opening degree error.

8. The supercharged internal combustion engine according to claim 6, wherein the correcting the throttle upstream pressure estimated value comprises:
- updating the throttle upstream pressure estimated value to be decreased when the actual throttle opening degree with respect to the actual effective opening area is larger than a throttle opening degree learning upper limit value set in advance; and
- updating the throttle upstream pressure estimated value to be increased when the actual throttle opening degree with respect to the actual effective opening area is smaller than a throttle opening degree learning lower limit value set in advance.

9. A control apparatus for a supercharged internal combustion engine including a throttle valve disposed in an intake pipe of the internal combustion engine, a supercharger including a compressor disposed in the intake pipe upstream of the throttle valve, an airflow sensor (AFS) disposed upstream of the compressor and detecting an intake air amount, and an intake manifold pressure sensor detecting a pressure in an intake manifold portion downstream of the throttle valve as an intake manifold pressure, the control apparatus comprising:
- a processor configured to execute a program; and
- a memory that stores the program which, when executed by the processor, performs:
- calculating a cylinder intake air amount taken from the intake manifold portion into a cylinder based on the intake manifold pressure;
- calculating an average density in a region combining a supercharged portion downstream of the compressor and upstream of the throttle valve and the intake manifold portion based on the intake air amount and the cylinder intake air amount;
- estimating a throttle upstream pressure, which is a pressure in a supercharged portion, based on the intake manifold pressure and the average density to output the estimated throttle upstream pressure as a throttle upstream pressure estimated value; and
- controlling the throttle upstream pressure based on the throttle upstream pressure estimated value by controlling a drive state of the supercharger.

* * * * *